(12) United States Patent
Shimauchi et al.

(10) Patent No.: US 11,818,454 B2
(45) Date of Patent: *Nov. 14, 2023

(54) CONTROLLER AND CONTROL METHOD

(71) Applicant: SONY CORPORATION, Tokyo (JP)

(72) Inventors: Kazuhiro Shimauchi, Tokyo (JP); Hidetoshi Nagano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,490

(22) Filed: Jan. 20, 2022

(65) Prior Publication Data
US 2022/0150402 A1 May 12, 2022

Related U.S. Application Data

(63) Continuation of application No. 16/771,870, filed as application No. PCT/JP2018/045032 on Dec. 7, 2018, now Pat. No. 11,265,461.

(30) Foreign Application Priority Data

Dec. 21, 2017 (JP) .................... 2017-244732

(51) Int. Cl.
  *G06F 3/16* (2006.01)
  *H04N 23/611* (2023.01)
  *H04N 7/18* (2006.01)
  *G06V 40/20* (2022.01)
  *H04N 23/69* (2023.01)

(52) U.S. Cl.
  CPC ........... *H04N 23/611* (2023.01); *G06V 40/25* (2022.01); *H04N 7/181* (2013.01); *H04N 23/69* (2023.01)

(58) Field of Classification Search
  CPC ............... H04N 5/23219; H04N 7/181; H04N 5/23296; G06K 9/00348
  See application file for complete search history.

(56) References Cited

U.S. PATENT DOCUMENTS

| | | | |
|---|---|---|---|
| 9,094,615 B2 * | 7/2015 | Aman | G06T 19/006 |
| 2003/0202102 A1 * | 10/2003 | Shiota | G08B 13/19608 |
| | | | 348/E7.086 |
| 2004/0130620 A1 | 7/2004 | Buehler et al. | |
| 2005/0012817 A1 * | 1/2005 | Hampapur | H04N 7/185 |
| | | | 348/E7.086 |

(Continued)

FOREIGN PATENT DOCUMENTS

| | | |
|---|---|---|
| CN | 103093654 A | 5/2013 |
| CN | 104822038 A | 8/2015 |

(Continued)

*Primary Examiner* — Howard D Brown, Jr.
(74) *Attorney, Agent, or Firm* — Oblon, McClelland, Maier & Neustadt, L.L.P.

(57) ABSTRACT

The present technology relates to a controller and a control method capable of providing an imaging system which achieves cost reduction.

A control unit controls a first imaging direction of a first imaging unit and a second imaging direction of a second imaging unit as a direction different from the first imaging direction in accordance with a situation of an object associated with a first image captured by the first imaging unit or a second image captured by the second imaging unit. For example, the present technology is applicable to a lecture capture system.

20 Claims, 39 Drawing Sheets

(56) References Cited

U.S. PATENT DOCUMENTS

| | | | |
|---|---|---|---|
| 2011/0317016 A1* | 12/2011 | Saeki | G08B 13/19652 |
| | | | 348/154 |
| 2012/0013704 A1 | 1/2012 | Sawayanagi et al. | |
| 2014/0063178 A1 | 3/2014 | Krans et al. | |
| 2016/0134838 A1 | 5/2016 | Tangeland et al. | |
| 2018/0232592 A1* | 8/2018 | Stewart | G08B 13/19606 |
| 2021/0182019 A1* | 6/2021 | Li | G06F 3/013 |

FOREIGN PATENT DOCUMENTS

| | | |
|---|---|---|
| CN | 104902203 A | 9/2015 |
| JP | H0918849 A | 1/1997 |
| JP | 2003289532 A | 10/2003 |
| JP | 2005033570 A | 2/2005 |
| WO | WO 2009/142332 A1 | 11/2009 |

\* cited by examiner

FIG. 6

State A

Behavior

| RESOURCE | ACTION |
|---|---|
| LECTURER CAMERA CONTROLLER | FIXED IMAGING ON Wide SIDE |
| | EXECUTE MOVING BODY DETECTION AT PRESET POSITION (PLATFORM) |
| AUDITOR CAMERA CONTROLLER | FIXED IMAGING ON Wide SIDE |
| | — |
| SWITCHER | OUTPUT LECTURER CAMERA IMAGE |

Event

| RESOURCE | CONDITION | SHIFT DESTINATION |
|---|---|---|
| LECTURER CAMERA CONTROLLER | MOVING BODY IS DETECTED AT PRESET POSITION (PLATFORM) | State B |

State B

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | FIXED IMAGING ON Wide SIDE |
| | EXECUTE GESTURE (STANDING UP) DETECTION |
| SWITCHER | OUTPUT LECTURER CAMERA IMAGE |

Event

| RESOURCE | CONDITION | SHIFT DESTINATION |
|---|---|---|
| AUDITOR CAMERA CONTROLLER | GESTURE (STANDING UP) IS DETECTED | State C |

FIG. 7

State C

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | PAN-TILT IMAGING ON Tele SIDE |
| | EXECUTE TRACKING, EXECUTE GESTURE (SITTING DOWN) DETECTION |
| SWITCHER | OUTPUT AUDITOR CAMERA IMAGE |

Event

| RESOURCE | CONDITION | SHIFT DESTINATION |
|---|---|---|
| AUDITOR CAMERA CONTROLLER | TRACKING TARGET MOVES BY ONLY DISTANCE SHORTER THAN FIXED DISTANCE FOR FIXED PERIOD OR LONGER | State D |
| AUDITOR CAMERA CONTROLLER | TRACKING TARGET MOVES BY FIXED DISTANCE OR LONGER WITHIN PERIOD SHORTER THAN FIXED PERIOD | State E |
| AUDITOR CAMERA CONTROLLER | GESTURE (SITTING DOWN) IS DETECTED IN PERIOD SHORTER THAN FIXED PERIOD | State B |

State D

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | PAN-TILT IMAGING ON Tele SIDE |
| | EXECUTE GESTURE (SITTING DOWN) DETECTION |
| SWITCHER | OUTPUT AFTER side-by-side MERGING |

Event

| RESOURCE | CONDITION | SHIFT DESTINATION |
|---|---|---|
| AUDITOR CAMERA CONTROLLER | GESTURE (SITTING DOWN) IS DETECTED | State B |

FIG. 8

State E

Behavior

| RESOURCE | ACTION |
|---|---|
| LECTURER CAMERA CONTROLLER | FIXED IMAGING ON Wide SIDE |
| | EXECUTE MOVING BODY DETECTION |
| AUDITOR CAMERA CONTROLLER | PAN-TILT IMAGING ON Tele SIDE |
| | EXECUTE TRACKING |
| SWITCHER | OUTPUT AUDITOR CAMERA IMAGE |

Event

| RESOURCE | CONDITION | SHIFT DESTINATION |
|---|---|---|
| LECTURER CAMERA CONTROLLER | A PLURALITY OF MOVING BODIES (LECTURER AND AUDITOR) ARE DETECTED AT PRESET POSITION (PLATFORM) | State F |

State F

Behavior

| RESOURCE | ACTION |
|---|---|
| LECTURER CAMERA CONTROLLER | PAN-TILT IMAGING ON Tele SIDE (FOR A PLURALITY OF PERSONS) |
| | EXECUTE TRACKING (FOR A PLURALITY OF PERSONS) |
| AUDITOR CAMERA CONTROLLER | FIXED IMAGING ON Wide SIDE |
| | — |
| SWITCHER | OUTPUT LECTURER CAMERA IMAGE |

Event

| RESOURCE | CONDITION | SHIFT DESTINATION |
|---|---|---|
| LECTURER CAMERA CONTROLLER | AUDITOR MOVES TO OUTSIDE OF PRESET POSITION (PLATFORM) | State B |

COMMON TO RESPECTIVE STATES

Event

| RESOURCE | CONDITION | SHIFT DESTINATION |
|---|---|---|
| CENTER CONTROL UNIT | END INSTRUCTION FROM USER | END |
| ALL RESOURCES | OCCURRENCE OF ERROR | State A |

FIG. 14

State B'

Behavior

| RESOURCE | ACTION | SHIFT DESTINATION |
|---|---|---|
| LECTURER CAMERA CONTROLLER | PAN-TILT IMAGING ON Tele SIDE | |
| | EXECUTE TRACKING | |
| AUDITOR CAMERA CONTROLLER | FIXED IMAGING ON Wide SIDE | |
| | EXECUTE GESTURE (RAISING HAND) DETECTION | |
| SWITCHER | OUTPUT LECTURER CAMERA IMAGE | |

Event

| RESOURCE | CONDITION | SHIFT DESTINATION |
|---|---|---|
| AUDITOR CAMERA CONTROLLER | GESTURE (RAISING HAND) IS DETECTED | State G |

State G

Behavior

| RESOURCE | ACTION | SHIFT DESTINATION |
|---|---|---|
| LECTURER CAMERA CONTROLLER | PAN-TILT IMAGING ON Tele SIDE | |
| | EXECUTE TRACKING | |
| AUDITOR CAMERA CONTROLLER | FIXED IMAGING ON Wide SIDE | |
| | EXECUTE GESTURE (STANDING UP) DETECTION | |
| SWITCHER | OUTPUT AUDITOR CAMERA IMAGE | |

Event

| RESOURCE | CONDITION | SHIFT DESTINATION |
|---|---|---|
| AUDITOR CAMERA CONTROLLER | GESTURE (STANDING UP) IS DETECTED | State G |

FIG.22

State B"

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | FIXED IMAGING ON Wide SIDE |
| | EXECUTE GESTURE (RAISING HAND) DETECTION |
| BOARD CAMERA CONTROLLER | FIXED IMAGING ON Wide SIDE |
| | EXECUTE BOARD EXTRACTION |
| SWITCHER | OUTPUT LECTURER CAMERA IMAGE |

Event

| RESOURCE | CONDITION | SHIFT DESTINATION |
|---|---|---|
| AUDITOR CAMERA CONTROLLER | GESTURE (RAISING HAND) IS DETECTED | State G |
| BOARD CAMERA CONTROLLER | WRITING TO OR DELETING FROM BOARD IS DETECTED | State H |

FIG. 23

State H

Behavior

| RESOURCE | ACTION |
|---|---|
| LECTURER CAMERA CONTROLLER | FIXED IMAGING ON Wide SIDE |
| | EXECUTE TRACKING |
| AUDITOR CAMERA CONTROLLER | FIXED IMAGING ON Wide SIDE |
| | EXECUTE GESTURE (RAISING HAND) DETECTION |
| BOARD CAMERA CONTROLLER | FIXED IMAGING ON Wide SIDE |
| | EXECUTE BOARD EXTRACTION |
| SWITCHER | OUTPUT BOARD EXTRACTION RESULT IMAGE |

Event

| RESOURCE | CONDITION | SHIFT DESTINATION |
|---|---|---|
| AUDITOR CAMERA CONTROLLER | GESTURE (RAISING HAND) IS DETECTED | State G |
| BOARD CAMERA CONTROLLER | WRITING TO OR DELETING FROM BOARD IS NOT DETECTED FOR FIXED PERIOD OR LONGER | State I |

State I

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | FIXED IMAGING ON Wide SIDE |
| | EXECUTE GESTURE (RAISING HAND) DETECTION |
| BOARD CAMERA CONTROLLER | FIXED IMAGING ON Wide SIDE |
| | EXECUTE BOARD EXTRACTION |
| SWITCHER | OUTPUT LECTURER CAMERA IMAGE AND BOARD EXTRACTION RESULT IMAGE MERGED BY side-by-side MERGING |

Event

| RESOURCE | CONDITION | SHIFT DESTINATION |
|---|---|---|
| AUDITOR CAMERA CONTROLLER | GESTURE (RAISING HAND) IS DETECTED | State G |
| BOARD CAMERA CONTROLLER | WRITING TO OR DELETING FROM BOARD IS DETECTED | State H |

FIG.27

State B''''

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | FIXED IMAGING ON Wide SIDE |
| | EXECUTE GESTURE (APPLAUSE) DETECTION |
| PC FOR SLIDE | OUTPUT SLIDE |
| SWITCHER | OUTPUT LECTURER CAMERA IMAGE |

Event

| RESOURCE | CONDITION | SHIFT DESTINATION |
|---|---|---|
| LECTURER CAMERA CONTROLLER | GESTURE (APPLAUSE) IS DETECTED | State M |
| PC FOR SLIDE | SLIDE IS SWITCHED | State J |

FIG. 28

State J

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | FIXED IMAGING ON Wide SIDE |
| | EXECUTE GESTURE (APPLAUSE) DETECTION |
| PC FOR SLIDE | OUTPUT SLIDE |
| SWITCHER | OUTPUT SLIDE |

Event

| RESOURCE | CONDITION | SHIFT DESTINATION |
|---|---|---|
| LECTURER CAMERA CONTROLLER | GESTURE (BODY LANGUAGE) IS DETECTED | State K |
| LECTURER CAMERA CONTROLLER | TRACKING TARGET MOVES BY FIXED DISTANCE OR LONGER | State L |
| AUDITOR CAMERA CONTROLLER | GESTURE (APPLAUSE) IS DETECTED | State M |

State K

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | FIXED IMAGING ON Wide SIDE |
| | EXECUTE GESTURE (APPLAUSE) DETECTION |
| PC FOR SLIDE | OUTPUT SLIDE |
| SWITCHER | OUTPUT LECTURER CAMERA IMAGE AND SLIDE MERGED BY side-by-side MERGING |

Event

| RESOURCE | CONDITION | SHIFT DESTINATION |
|---|---|---|
| LECTURER CAMERA CONTROLLER | TRACKING TARGET MOVES BY FIXED DISTANCE OR LONGER | State L |
| AUDITOR CAMERA CONTROLLER | GESTURE (APPLAUSE) IS DETECTED | State M |
| PC FOR SLIDE | SLIDE IS SWITCHED | State J |

F I G. 29

State L

Behavior

| RESOURCE | ACTION |
|---|---|
| LECTURER CAMERA CONTROLLER | PAN-TILT IMAGING AT ANGLE OF VIEW SUFFICIENT FOR INCLUDING LECTURER AND SLIDE |
| | EXECUTE TRACKING |
| AUDITOR CAMERA CONTROLLER | FIXED IMAGING ON Wide SIDE |
| | EXECUTE GESTURE (APPLAUSE) DETECTION |
| PC FOR SLIDE | OUTPUT SLIDE |
| SWITCHER | OUTPUT LECTURER CAMERA IMAGE |

Event

| RESOURCE | CONDITION | SHIFT DESTINATION |
|---|---|---|
| LECTURER CAMERA CONTROLLER | GESTURE (BODY LANGUAGE) IS DETECTED | State K |
| AUDITOR CAMERA CONTROLLER | GESTURE (APPLAUSE) IS DETECTED | State M |
| PC FOR SLIDE | SLIDE IS SWITCHED | State J |

State M

Behavior

| RESOURCE | ACTION |
|---|---|
| LECTURER CAMERA CONTROLLER | PAN-TILT IMAGING ON Tele SIDE |
| | EXECUTE TRACKING |
| AUDITOR CAMERA CONTROLLER | PAN-TILT IMAGING ON Tele SIDE |
| PC FOR SLIDE | — |
| SWITCHER | OUTPUT SLIDE |
| | OUTPUT AUDITOR CAMERA IMAGE |

Event

| RESOURCE | CONDITION | SHIFT DESTINATION |
|---|---|---|
| CENTER CONTROL UNIT | FIXED TIME ELAPSES | State B'' |

FIG. 33

State A'

Behavior

| RESOURCE | ACTION |
|---|---|
| LECTURER CAMERA CONTROLLER | FIXED IMAGING ON Wide SIDE<br>EXECUTE FACE DETECTION OR FACE IDENTIFICATION AT PRESET POSITION (PLATFORM) |
| AUDITOR CAMERA CONTROLLER | FIXED IMAGING ON Wide SIDE |
| SWITCHER | OUTPUT LECTURER CAMERA IMAGE |

Event

| RESOURCE | CONDITION | SHIFT DESTINATION |
|---|---|---|
| LECTURER CAMERA CONTROLLER | FACE IS DETECTED OR PARTICULAR FACE IS IDENTIFIED AT PRESET POSITION (PLATFORM) | State B |

State E'

Behavior

| RESOURCE | ACTION |
|---|---|
| LECTURER CAMERA CONTROLLER | FIXED IMAGING ON Wide SIDE<br>EXECUTE FACE DETECTION OR FACE IDENTIFICATION |
| AUDITOR CAMERA CONTROLLER | PAN-TILT IMAGING ON Tele SIDE<br>EXECUTE TRACKING |
| SWITCHER | OUTPUT AUDITOR CAMERA IMAGE |

Event

| RESOURCE | CONDITION | SHIFT DESTINATION |
|---|---|---|
| LECTURER CAMERA CONTROLLER | A PLURALITY OF FACES (LECTURER AND AUDITOR) ARE DETECTED OR A PLURALITY OF PARTICULAR FACES ARE IDENTIFIED AT PRESET POSITION (PLATFORM) | State F' |

CONTROLLER AND CONTROL METHOD

CROSS REFERENCE TO RELATED APPLICATIONS

This application is a continuation of U.S. application Ser. No. 16/771,870, filed on Jun. 11, 2020, and is based upon and claims the benefit of priority to International Application No. PCT/JP2018/045032, filed on Dec. 7, 2018 and JP 2017-244732, filed on Dec. 21, 2017. The entire contents of U.S. Ser. No. 16/771,870 are incorporated herein by reference.

TECHNICAL FIELD

The present technology relates to a controller and a control method, and particularly to a controller and a control method capable of providing an imaging system which achieves cost reduction.

BACKGROUND ART

A lecture capture system has been provided in recent years to record a state of a lecture given in a college or other schools, and allow attendance at the lecture in a remote place.

PTL 1 discloses a lecture capture system which images a lecturer and an auditor to track the lecturer and detect a standing-up action of the auditor, and switches between videos of the lecturer and the auditor or merges the videos into one video for outputting, as necessary.

For tracking the lecturer and detecting the standing-up action of the auditor, the system of PTL 1 includes two overhead cameras capable of capturing overhead views of the lecturer and the auditor, and two tracking cameras tracking the lecturer and the auditor detected by the respective overhead cameras. Each of the tracking cameras is a drive-type camera capable of performing panning, tilting, and zooming, and can capture and image an object at an appropriate angle of view.

CITATION LIST

Patent Literature

[PTL 1]
JP 2005-33570 A

SUMMARY

Technical Problem

Meanwhile, if imaging in different directions is conventionally controllable in accordance with a situation of an object corresponding to an imaging target of each of the directions, reduction of the number of cameras, and therefore cost reduction of the system are achievable.

The present technology has been developed in consideration of the aforementioned circumstances, and provides an imaging system which achieves cost reduction.

Solution to Problem

A controller of the present technology includes a control unit that controls a first imaging direction of a first imaging unit and a second imaging direction of a second imaging unit as a direction different from the first imaging direction in accordance with a situation of an object associated with a first image captured by the first imaging unit or a second image captured by the second imaging unit.

A control method according to the present technology is a control method of a controller. The control method includes controlling a first imaging direction of a first imaging unit and a second imaging direction of a second imaging unit as a direction different from the first imaging direction in accordance with a situation of an object associated with a first image captured by the first imaging unit or a second image captured by the second imaging unit.

According to the present technology, the first imaging direction of the first imaging unit and the second imaging direction of the second imaging unit, which direction is different from the first imaging direction, are controlled in accordance with the situation of the object associated with the first image captured by the first imaging unit or the second image captured by the second imaging unit.

Advantageous Effects of Invention

According to the present technology, an imaging system which achieves cost reduction can be provided.

Note that advantageous effects to be offered are not necessarily limited to the advantageous effects described herein, but may be any advantageous effects described in the present disclosure.

BRIEF DESCRIPTION OF DRAWINGS

FIG. 6 is a diagram depicting details of States.

FIG. 7 is a diagram depicting details of States.

FIG. 8 is a diagram depicting details of States.

FIG. 14 is a diagram depicting details of States.

FIG. 22 is a diagram depicting details of States.

FIG. 23 is a diagram depicting details of States.

FIG. 27 is a diagram depicting details of States.

FIG. 28 is a diagram depicting details of States.

FIG. 29 is a diagram depicting details of States.

FIG. 33 is a diagram depicting details of States.

DESCRIPTION OF EMBODIMENTS

Figure 1:
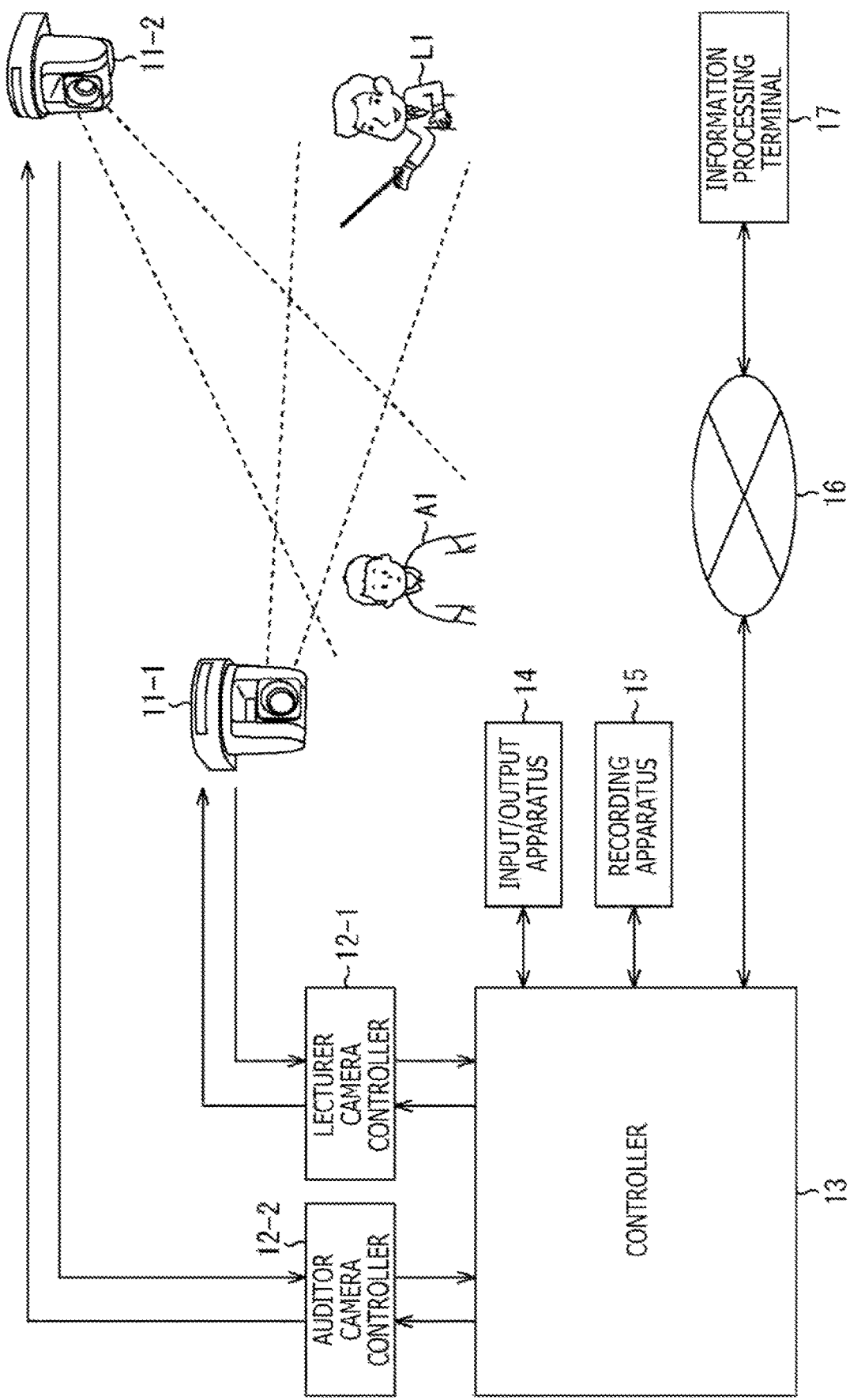
FIG. 1 is a diagram depicting a configuration example of an imaging system to which the present technology is applied.

Modes for carrying out the present disclosure (hereinafter referred to as embodiments) will be hereinafter described. Note that the description will be presented in a following order.

0. Problems arising from conventional lecture capture system

1. First Embodiment (Basic Configuration and Action of Imaging System)

2. Second Embodiment (Configuration Outputting Contents Written On Board)

3. Third Embodiment (Configuration Outputting Presentation Slide)

4. Other variation examples

5. Application examples

0. PROBLEMS ARISING FROM CONVENTIONAL LECTURE CAPTURE SYSTEM

There is conventionally known such a lecture capture system which images a lecturer and an auditor to track the lecturer and detect a standing-up action of the auditor, and switches between videos of the lecturer and the auditor or merges the videos into one video for outputting, as necessary.

For tracking the lecturer and detecting the standing-up action of the auditor, this system includes two overhead cameras capable of capturing overhead views of the lecturer and the auditor, and two tracking cameras tracking the lecturer and the auditor detected by the respective overhead cameras.

However, following problems are arising from the conventional lecture capture system.

(Problem 1)

This system requires overhead cameras each detecting an object in addition to tracking cameras each tracking and imaging the object. Accordingly, costs of the system increase.

(Problem 2)

Moreover, action procedures of the entire system described above (e.g., zooming-in the auditor by the tracking cameras at the time of detection of the standing-up action of the auditor by the overhead cameras) are determined by a system designer beforehand. Accordingly, any change of the actions of the system is generally difficult to make by a user.

For example, while a lecture style varies for each lecturer, the lecturer of the conventional system is required to be conscious of the actions determined beforehand while giving a lecture. In this case, the lecture cannot be given in an original style.

In addition, according to the conventional system, changes of the system configuration (e.g., increase or decrease of the number of tracking cameras, and use of a combination of cameras having different functions and performance) are also difficult to flexibly handle.

(Problem 3)

Furthermore, the conventional system is designed chiefly for the purpose of imaging a lecturer and an auditor. In this case, contents written on a board during a lecture and slides for presentation are not clearly recorded. Accordingly, detailed contents on the board and the presentation are difficult to recognize by an audience.

In consideration of the above, hereinafter described will be configurations and actions of a system capable of solving the aforementioned problems.

According to an imaging system of the present embodiments, a control unit controls a first imaging direction of a first camera, and a second imaging direction of a second camera as a direction different from the first imaging direction in accordance with a situation of an object associated with a first image or a second image. A range of imaging by the first camera is controlled by controlling the first imaging direction, while a range of imaging by the second camera is controlled by controlling the second imaging direction.

The object associated with the first image or the second image may include not only a person such as a lecturer and an auditor described below, but also a blackboard or a whiteboard used for board writing, and further slides and materials outputted from a PC (Personal Computer).

1. FIRST EMBODIMENT (Configuration Example of Imaging System)

FIG. 1 is a diagram depicting a configuration example of an imaging system to which the present technology is applied.

An imaging system depicted in FIG. 1 is configured as a lecture capture system, and provided in a classroom, a lecture hall or the like where a lecturer L1 gives a lecture to a plurality of auditors A1.

The imaging system in FIG. 1 includes a lecturer camera 11-1, an auditor camera 11-2, a lecturer camera controller 12-1, an auditor camera controller 12-2, and a controller 13. An input/output apparatus 14 and a recording apparatus 15 are added to the controller 13, and an information processing terminal 17 is further connected to the controller 13 via a network 16.

The lecturer camera 11-1 as the first imaging unit captures an image of the lecturer L1, and outputs the captured image (lecturer camera image) to the lecturer camera controller 12-1 under control by the lecturer camera controller 12-1.

The auditor camera 11-2 as the second imaging unit captures an image of the auditors A1 located in a direction different from a direction where the lecturer L1 is located, and outputs the captured image (auditor camera image) to the auditor camera controller 12-2 under control by the auditor camera controller 12-2.

For example, the lecturer camera 11-1 and the auditor camera 11-2 are disposed in such positions as to face each other (such positions that respective imaging directions face each other) in a front part (platform side) and a rear part of the classroom, respectively, to image in the direction where the lecturer L1 is located, and in the direction where the auditors A1 are located.

The lecturer camera 11-1 and the auditor camera 11-2 may have a similar configuration except for only a difference of an object corresponding to an imaging target, i.e., whether the object is the lecturer L1 or the auditors A1. For example, the lecturer camera 11-1 and the auditor camera 11-2 are each configured as a PTZ camera which has a function of mechanical panning and tilting, and also are each capable of performing optical and electronical zooming.

Note that the lecturer 11-1 and the auditor camera 11-2 are each only required to image objects located in different directions (in other words, different types of object) without the necessity of equipping an overhead camera. The positions of the respective cameras 11-1 and 11-2 are not limited to the positions described above.

For example, assuming that the front side of the classroom is located in the direction of 12 o'clock, the lecturer camera 11-1 is disposed in the vicinity of the center of the classroom in such a position as to image in the direction of 12 o'clock. In this case, it is sufficient that the auditor camera 11-2 is disposed in the vicinity of the center of the classroom in such a position as to image in the direction of 6 o'clock, or image in the direction of 3 o'clock or 9 o'clock in correspondence with the direction where the auditors A1 are located.

In addition, in a case where the two lecturers L1 are present, for example, assuming that the front side of the classroom is located in the direction of 12 o'clock, the two lecturer cameras 11-1 are disposed in the vicinity of the center of the classroom in such positions as to image in the direction of 10 o'clock and 2 o'clock, respectively.

Furthermore, the lecturer camera 11-1 and the auditor camera 11-2 may be configured as a single 360-degree camera or a fish-eye camera (one imaging apparatus). In this case, the lecturer camera image and the auditor camera image are obtained by cutting an image in the direction where the lecturer L1 is located, and an image in the direction where the auditors A1 are located from an omnidirectional image and a wide-angle image obtained by the 360-degree camera or the fish-eye camera.

As described above, the imaging system to which the present technology is applied is not required to have the configuration which uses a plurality of cameras so disposed as to image in different directions, but may have other configurations as long as images having different imaging ranges (angles of view and imaging directions) can be obtained.

The lecturer camera 11-1 and the auditor camera 11-2 are hereinafter simply referred to as cameras 11 in a case where no distinction is made between the lecturer camera 11-1 and the auditor camera 11-2. Images outputted from the cameras 11 are referred to as camera images. In addition, it is assumed hereinafter that the camera images are moving images. However, the camera images may be still images, or continuous images obtained by continuously imaging in terms of time.

The lecturer camera controller 12-1 controls the angle of view or the imaging direction of the lecturer camera 11-1 under control by the controller 13 to control the imaging range of the lecturer camera 11-1. The lecturer camera image outputted from the lecturer camera 11-1 is outputted to the controller 13. In addition, the lecturer camera controller 12-1 receives an instruction of calculation and control from the controller 13, and outputs a result of calculation and control to the controller 13.

The auditor camera controller 12-2 controls the angle of view or the imaging direction of the auditor camera 11-2 under control by the controller 13 to control the imaging range of the auditor camera 11-2. The auditor camera image outputted from the auditor camera 11-2 is outputted to the controller 13. In addition, the auditor camera controller 12-2 receives an instruction of calculation and control from the controller 13, and outputs a result of calculation and control to the controller 13.

The lecturer camera controller 12-1 and the auditor camera controller 12-2 may have a similar configuration except for only a difference in a control target, i.e., whether the control target is the lecturer camera 11-1 or the auditor camera 11-2.

The lecturer camera controller 12-1 and the auditor camera controller 12-2 are hereinafter simply referred to as camera controllers 12 in a case where no distinction is made between the lecturer camera controller 12-1 and the auditor camera controller 12-2. Note that the camera controllers 12 may be built in the cameras 11.

In addition, in a case where the cameras 11 are configured as a single 360-degree camera or fish-eye camera, the single camera controller 12 is provided to control ranges of the lecturer camera image and the auditor camera image cut from an omnidirectional image or a wide-angle image.

As described above, the camera controllers 12 control imaging ranges of the lecturer camera image and the auditor camera image by controlling angles of view and imaging directions of the cameras 11, or ranges cut from an omnidirectional image or a wide-angle image.

The controller 13 controls the plurality of camera controllers 12 (lecturer camera controller 12-1 and auditor camera controller 12-2) to acquire camera images outputted from the respective camera controllers 12, and output the camera images switched or merged into one image, for example. The outputted camera images are recorded in the recording apparatus 15, or transmitted to the information processing terminal 17 via the network 16.

In addition, the controller 13 outputs an instruction of calculation and control to each of the camera controllers 12, and acquires a result of calculation and control from each of the camera controllers 12. The controller 13 controls the camera controllers 12 on the basis of the results of calculation and control received from the camera controllers 12.

Note that the camera controllers 12 and the controller 13 may each include dedicated hardware having corresponding functions, or include an ordinary computer and implement corresponding functions by software. In addition, the camera controllers 12 and the controller 13 may be configured not as components separated from each other, but as components provided integrally with each other as one controller.

The input/output apparatus 14 includes a keyboard and a mouse receiving an operation from a user, and also a display and the like having a display function. This display may have a function of a touch panel. The controller 13 defines a scenario which represents action procedures of respective apparatuses constituting the imaging system (how to implement actions of respective apparatuses) on the basis of operations performed by the system designer or the user and received via the input/output apparatus 14 to control the actions of the imaging system. Details of the scenario will be described below.

The information processing terminal 17 is a terminal used by an audience located within a space where a lecture is given by the lecturer L1 or in a remote place to view and listen to images outputted from the controller 13.

The information processing terminal 17 may include dedicated hardware having a corresponding function, or may include an ordinary computer and implement the corresponding function by software. In addition, a camera, a microphone or the like may be provided on the information processing terminal 17 to transmit images and voices from the space where the audience is located to the controller 13 via the network 16.

(Functional Configuration Example of Camera Controller)

Figure 2:
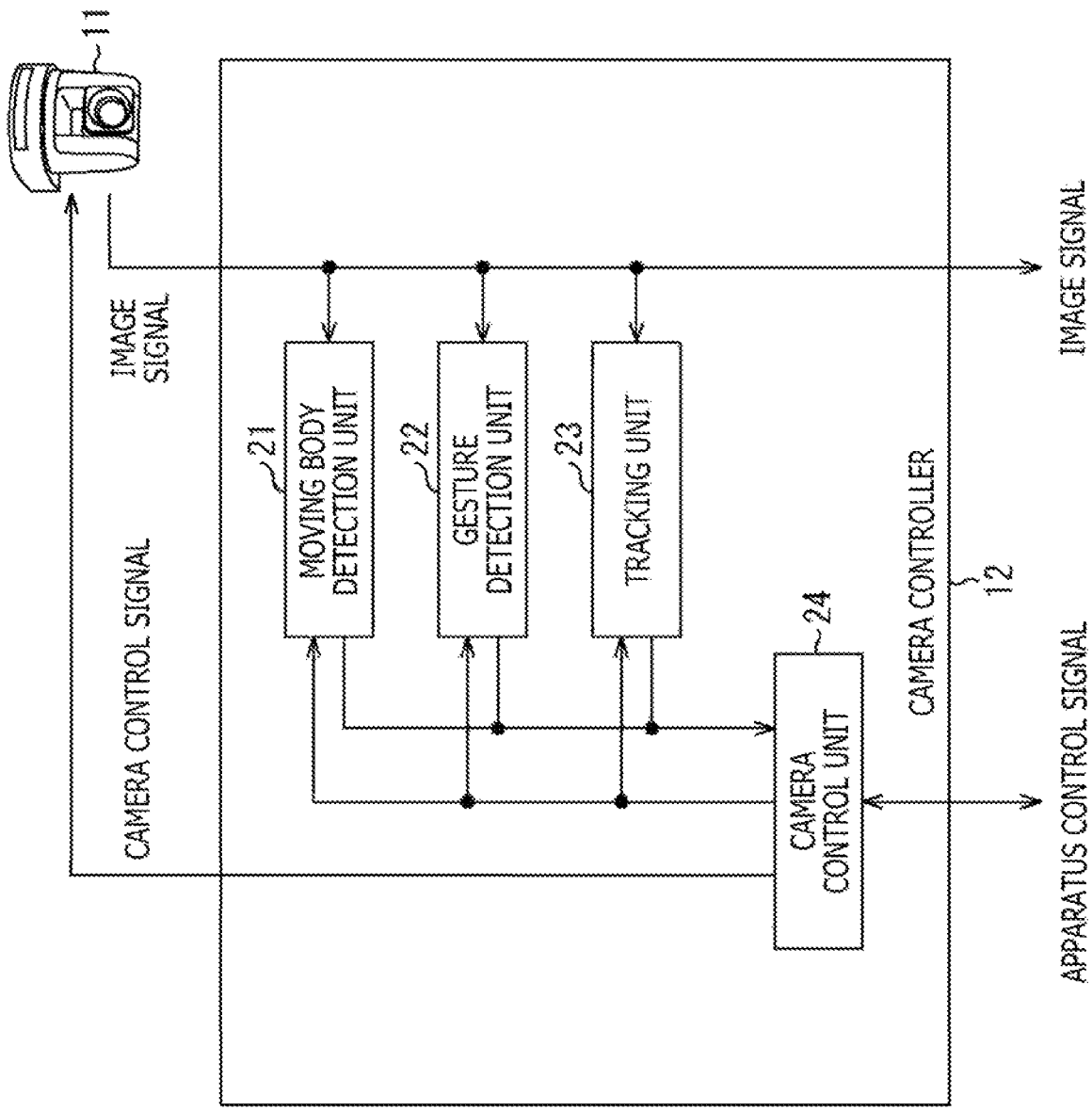
FIG. 2 is a block diagram depicting a functional configuration example of a camera controller.

FIG. 2 is a block diagram depicting a functional configuration example of the camera controllers 12 (lecturer camera controller 12-1 and the auditor camera controller 12-2) described above.

The camera controller 12 includes a moving body detection unit 21, a gesture detection unit 22, a tracking unit 23, and a camera control unit 24.

The moving body detection unit 21 acquires a camera image (image signal) from each of the cameras 11, and detects a moving body in the camera image under control by the camera control unit 24. Information indicating a position (e.g., coordinates) and a shape of the detected moving body is supplied to the camera control unit 24.

The gesture detection unit 22 acquires a camera image (image signal) from each of the cameras 11, and detects a gesture (action) of an object (lecturer L1 or auditor A1) in the camera image under control by the camera control unit 24. Information indicating a type and a posture of the detected gesture is supplied to the camera control unit 24.

The tracking unit 23 acquires a camera image (image signal) from each of the cameras 11, and tracks an object in the camera image under control by the camera control unit 24. Information indicating a position (e.g., coordinates) and a shape of an object corresponding to a tracking target is supplied to the camera control unit 24.

The camera control unit 24 controls the respective units provided as the moving body detection unit 21, the gesture detection unit 22, and the tracking unit 23, and calculates appropriate angles of view and camerawork of the cameras 11 on the basis of information obtained from the respective units as a result of the control. The camera control unit 24 controls the cameras 11 on the basis of a camera control signal indicating a result of this calculation.

Moreover, the camera control unit 24 exchanges information provided for executing the scenario described below, information indicating states of the cameras 11 and results of calculation and control, and the like with the controller 13 as apparatus control signals.

Figure 3:
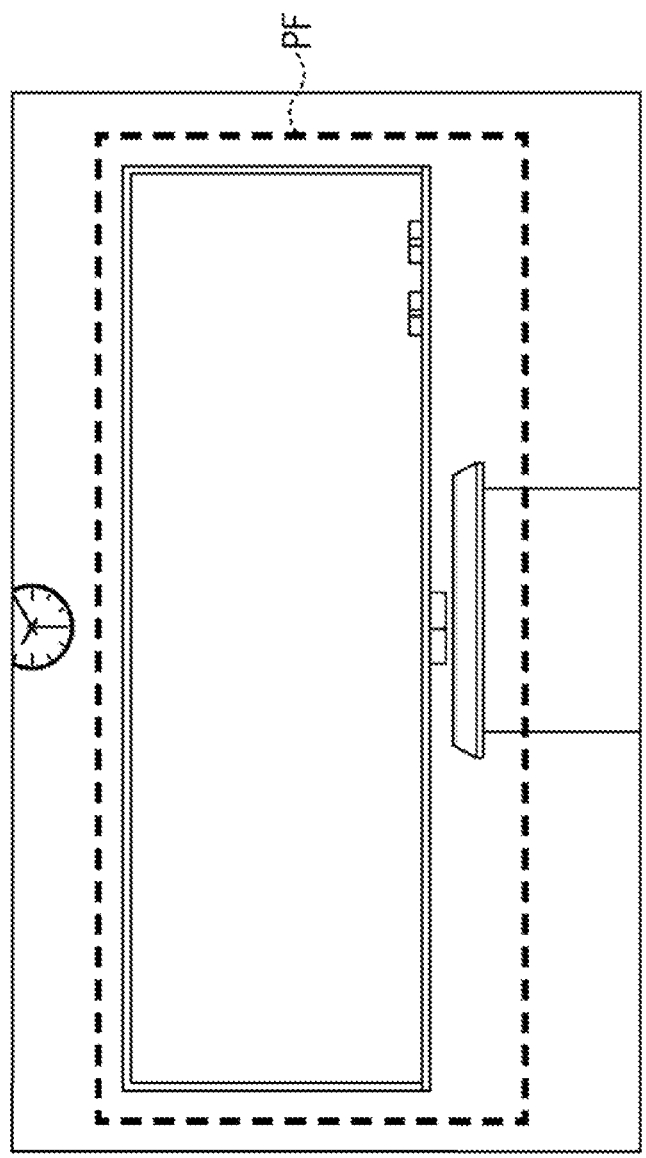
FIG. 3 is a diagram depicting an example of a preset position set by a camera control unit.

When the camera control unit 24 controls the respective units provided as the moving body detection unit 21, the gesture detection unit 22, and the tracking unit 23, a preset position indicated by a frame PF in FIG. 3 is set as a preset position of the angle of view of the lecturer camera image, for example. In FIG. 3, the preset position (frame PF) is set to a range around a blackboard and a platform (teacher's desk) of the classroom.

When the lecturer L1 stands on the platform, for example, i.e., when a moving body is detected within the frame PF preset in the lecturer camera image by the moving body detection unit 21, the camera control unit 24 shifts the control target to the tracking unit 23 in response to this detection as a trigger. The camera control unit 24 calculates an appropriate angle of view of the lecturer camera 11-1 on the basis of information obtained as a result of tracking of the object (lecturer L1) by the tracking unit 23, and generates a camera control signal for controlling panning, tilting, and zooming to control the lecturer camera 11-1.

(Functional Configuration Example of Controller)

Figure 4:
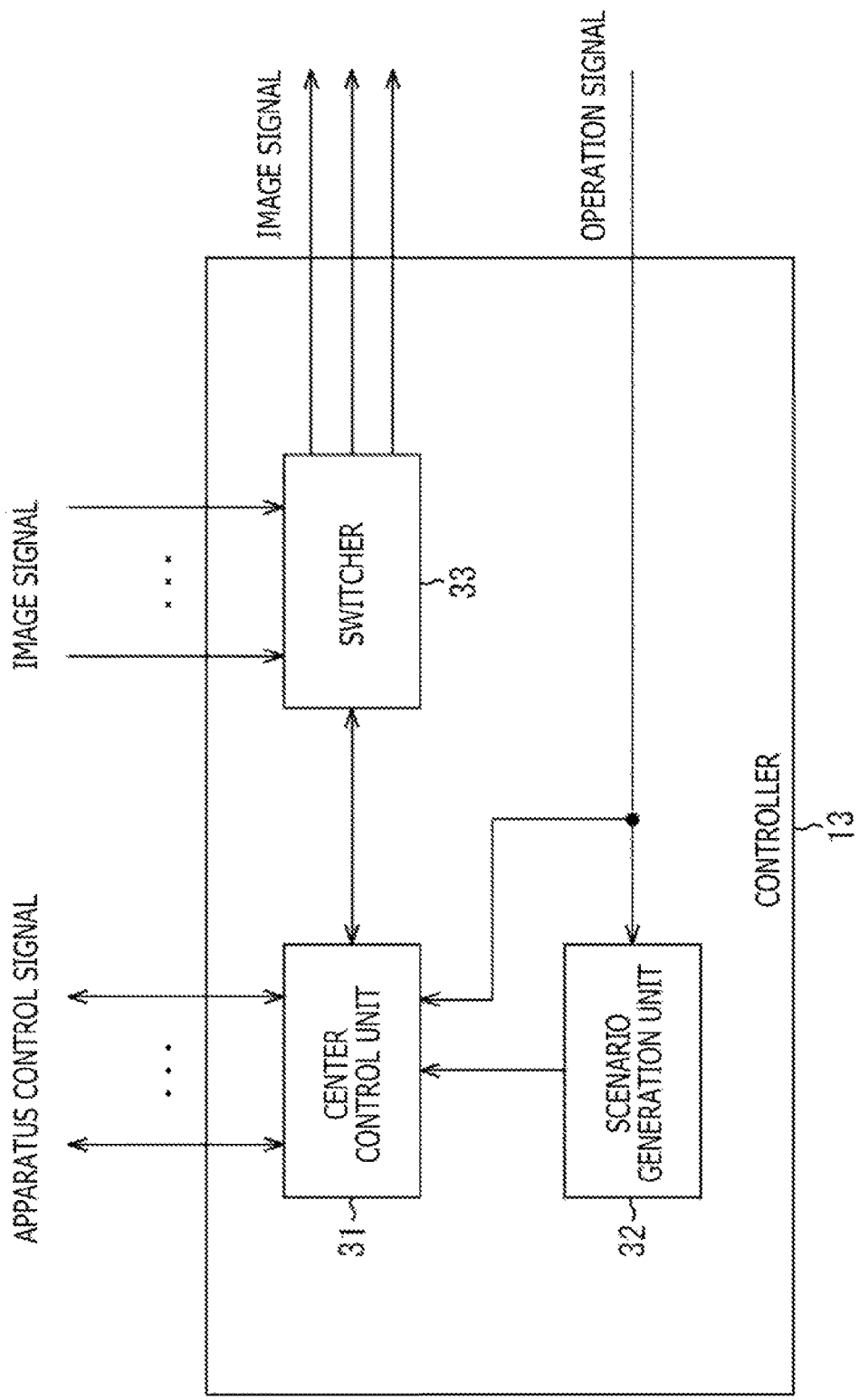
FIG. 4 is a block diagram depicting a functional configuration example of a controller.

FIG. 4 is a block diagram depicting a functional configuration example of the controller 13 described above.

The controller 13 includes a center control unit 31, a scenario generation unit 32, and a switcher 33.

The center control unit 31 executes action control of the entire imaging system on the basis of the scenario (described below) defined beforehand. For example, the center control unit 31 integratedly controls imaging of the lecturer camera 11-1 (in the direction where the lecturer L1 is located), and imaging of the auditor camera 11-2 (in the direction where the auditors A1 are located) in accordance with a situation of an object associated with the lecturer camera image or the auditor camera image.

More specifically, the center control unit 31 acquires the lecturer camera image by controlling the lecturer camera controller 12-1, and acquires the auditor camera image by controlling the auditor camera controller 12-2. Thereafter, the center control unit 31 controls imaging by the respective cameras 11 (actions of the respective camera controllers 12) in accordance with the situation of the object in the lecturer camera image or the auditor camera image under the scenario, and controls output of at least any one of the obtained camera images (action of the switcher 33).

For example, the situation of the object refers to a behavior of the object. The behavior of the object may be either an action of the object, or a sound emitted from the object. Specific examples of the action of the object include standing up, sitting down, raising hand, applause, respective actions such as body languages and pointing carried out during explanation of matters, movement to the preset position described above, movement from the preset position, and others detected by gesture detection. Examples of the sound emitted from the object include spoken voices such as a call given to another person and a reply to this call, sounds of applause, chimes, and others.

More specifically, according to the imaging system of the present embodiment, the angles of view and the imaging directions of the cameras 11 (the lecturer camera 11-1 and the auditor camera 11-2) (respective imaging ranges of the cameras 11) are controlled in accordance with the situation of the object as described above.

In addition to this control, the imaging directions of the cameras 11 may be controlled in a case where an overlap between a plurality of objects is detected in the camera images acquired by the cameras 11 as the situation of the object, for example. Moreover, the angles of view and the imaging directions of the cameras 11 may be controlled in a case where the same type of object is detected in the camera images acquired by the cameras 11 as the situation of the object, for example.

The scenario is information which describes shifts of states of the respective camera controllers 12 and the switcher 33 corresponding to action control targets. More specifically, the scenario describes actions (Behaviors) executed by the respective control targets, and triggers (Events) for shifting to other states for each of a plurality of states (States) of the entire imaging system.

The center control unit 31 issues apparatus control signals to the respective controllers 12 and the switcher 33 to request the respective controllers 12 and the switcher 33 to perform Behaviors and Events described in the scenario. In this manner, the center control unit 31 manages the states (States) of the respective camera controllers 12 and the switcher 33, and controls the actions of the respective camera controllers 12 and the switcher 33. A basic dialog with the user, such as a start and an end of execution of the scenario, and selection of the scenario to be executed, is achieved on the basis of an operation signal supplied from the input/output apparatus 14.

The center control unit 31 may execute not only the scenario defined beforehand, but also a scenario generated by the scenario generation unit 32.

The scenario generation unit 32 enables the user to define and generate a scenario. A basic dialog with the user for generating a scenario is achieved on the basis of an operation signal supplied from the input/output apparatus 14. The generated scenario is supplied to the center control unit 31.

The switcher 33 as an output control unit acquires camera images (image signals) outputted from the respective camera controllers 12, and outputs any one of the image signals after switching to this image signal, or outputs an image signal produced by merging a plurality of the image signals under control by the center control unit 31. The outputted image signal is recorded in the recording apparatus 15, or transmitted to the information processing terminal 17 via the network 16.

Examples of merging of camera images (image signals) by the switcher 33 include side-by-side merging in which two images are arranged side by side, picture-in-picture merging in which one image is displayed inside another image, overlaying in which two images are overlaid, and others.

While the switcher 33 in the example of FIG. 4 is built in the controller 13, note that the switcher 33 may be configured as an independent apparatus separated from the controller 13.

(Description Example of Scenario)

A description example of the scenario will be herein described with reference to FIG. 5.

Figure 5:
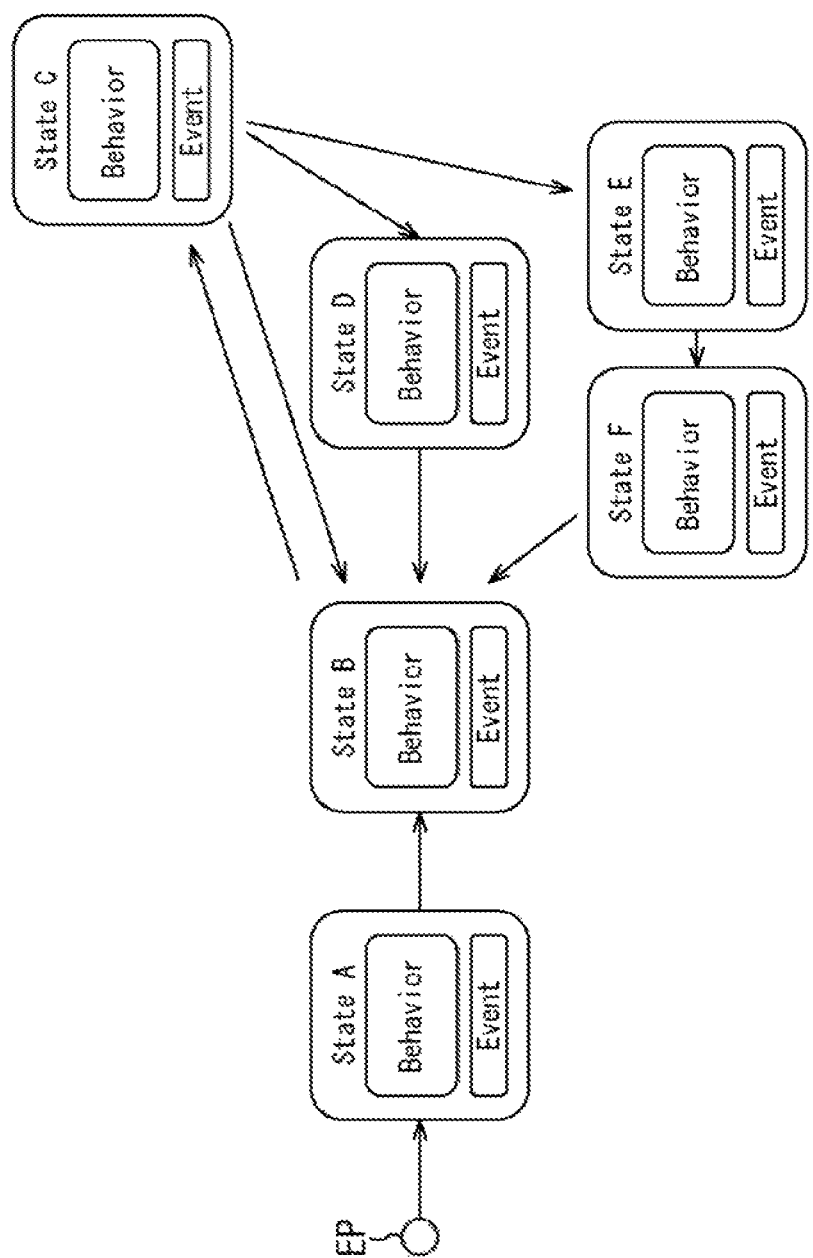
FIG. 5 is a diagram depicting a description example of a scenario.

As described in FIG. 5, the scenario includes at least one Entry Point (EP), and at least one State.

EP indicates a start point of the scenario. When an instruction of an execution start of the scenario is issued from the user, a process for executing the scenario starts from EP.

Behavior and Event are described in each State.

Actions executed by respective apparatuses connected to the controller 13 (center control unit 31) and corresponding to action control targets are described in Behavior.

Action results of the control targets as conditions for shifting to different states as triggers for shifting to the different states, and state shift destinations associated with the shift conditions are described in Event.

Accordingly, in a case where an action executed by any one of the respective control targets meets a shift condition described in Event of certain State during execution of actions described in Behavior of this State by the respective control targets, this State shifts to different State described in association with the shift condition. The scenario is therefore considered to cover expressions of all shifts from States to States based on Event.

Note that each of the shift conditions is assumed to be set on the basis of a change of a situation of the object in the lecturer camera image (lecturer L1) or the object in the auditor camera image (auditor A1). While details will be described below, examples of the shift conditions include a condition based on movement of the lecturer L1, and a condition based on actions of the auditors A1.

An example in FIG. 5 depicts one EP and six States A to F. Respective States are connected by unidirectional or bidirectional arrows. The state of the imaging system shifts between EP and respective States in accordance with these arrows.

FIGS. 6 to 8 depict details of States A to F.

Behavior of each of States describes actions executed by respective resources (respective apparatuses provided as the lecturer camera controller 12-1, the auditor camera controller 12-2, and the switcher 33) connected to the center control unit 31.

Concerning the lecturer camera controller 12-1 and the auditor camera controller 12-2, an action (upper row) associated with imaging control by the corresponding camera 11, and calculation (lower row) performed by the corresponding camera controller 12 are described. Concerning the switcher 33, an action associated with image output is described.

The contents and the number of the actions of the respective apparatuses in Behavior vary in accordance with the contents and the number of the functions included in the respective apparatuses. Accordingly, the center control unit 31 is configured to inquire of the respective connected apparatuses to recognize the contents and the number of the functions of the respective apparatuses.

Action results of the resources (apparatuses) corresponding to a condition of shifting to a subsequent state, and a state shift destination are described in Event in each of States. Only one shift destination and one shift condition, or a plurality of destinations and a plurality of conditions are described in each Event. In addition, Event may be described in common to respective States, rather than for each State. For example, as Event in common to respective States, one or a plurality of conditions for forcibly shifting to a different state in such cases as a case where an error is caused, and a case where an interruption is made by the user in any one of States, and one or a plurality of shift destinations of the corresponding condition or conditions can be described.

As actions of the lecturer camera controller 12-1, fixed imaging on the Wide side, and execution of moving body detection at the preset position (platform) (by the lecturer camera 11-1) are described in Behavior of State A (FIG. 6). Moreover, as an action of the auditor camera controller 12-2, fixed imaging on the Wide side (by the auditor camera 11-2) is described. Furthermore, as an action of the switcher 33, output of the lecturer camera image is described.

A shift of the state to State B in a case where the lecturer camera controller 12-1 detects a moving body at the preset position (platform) is described in Event of State A.

As actions of the lecturer camera controller 12-1, pan-tilt imaging on the Tele side, and execution of tracking (by the lecturer camera 11-1) are described in Behavior of State B (FIG. 6). Moreover, as actions of the auditor camera controller 12-2, fixed imaging on the Wide side, and execution of gesture (standing up) detection (by the auditor camera 11-2) are described. Furthermore, as an action of the switcher 33, output of the lecturer camera image is described.

A shift of the state to State C in a case where the auditor camera controller 12-2 detects a gesture (standing up) is described in Event of State B.

As actions of the lecturer camera controller 12-1, pan-tilt imaging on the Tele side, and execution of tracking (by the lecturer camera 11-1) are described in Behavior of State C (FIG. 7). Moreover, as actions of the auditor camera controller 12-2, pan-tilt imaging on the Tele side, and tracking and execution of gesture (sitting down) detection (by the auditor camera 11-2) are described. Furthermore, as an action of the switcher 33, output of the auditor camera image is described.

A shift of the state to State D in a case where the auditor camera controller 12-2 determines that a tracking target shifts only by a distance shorter than a fixed distance for a fixed period or longer is described in Event of State C. Moreover, a shift of the state to State E in a case where the auditor camera controller 12-2 determines that a tracking target does not shift by a fixed distance or longer in a period shorter than a fixed period is described. Furthermore, a shift of the state to State B in a case where the auditor camera controller 12-2 detects a gesture (sitting down) in a period shorter than a fixed period is described.

As actions of the lecturer camera controller 12-1, pan-tilt imaging on the Tele side, and execution of tracking (by the lecturer camera 11-1) are described in Behavior of State D (FIG. 7). Moreover, as actions of the auditor camera controller 12-2, pan-tilt imaging on the Tele side, and execution of gesture (sitting down) detection (by the auditor camera 11-2) are described. Furthermore, as an action of the switcher 33, it is described that the lecturer camera image and the auditor camera image are merged side by side to be outputted.

A shift of the state to State B in a case where the auditor camera controller 12-2 detects a gesture (sitting down) is described in Event of State D.

As actions of the lecturer camera controller 12-1, fixed imaging on the Tele side, and execution of moving body detection (by the lecturer camera 11-1) are described in Behavior of State E (FIG. 8). Moreover, as actions of the auditor camera controller 12-2, pan-tilt imaging on the Tele side, and execution of tracking (by the auditor camera 11-2) are described. Furthermore, as an action of the switcher 33, output of the auditor camera image is described.

A shift of the state to State F in a case where the lecturer camera controller 12-1 detects a plurality of moving bodies (i.e., two or more persons as a lecturer and an auditor) at the preset position (platform) is described in Event of State E.

As actions of the lecturer camera controller 12-1, pan-tilt imaging on the Tele side, and execution of tracking (by the lecturer camera 11-1) are described in Behavior of State F (FIG. 8). The pan-tilt imaging and tracking herein are performed in correspondence with a plurality of persons. Moreover, as an action of the auditor camera controller 12-2, fixed imaging on the Wide side (by the auditor camera 11-2) is described. Furthermore, as an action of the switcher 33, output of the lecturer camera image is described.

A shift of the state to State B in a case where the lecturer camera controller 12-1 determines that the auditor has moved to the outside of the preset position (platform) is described in Event of State F.

Moreover, as Event common to respective States (FIG. 8), an end of the action of the entire imaging system in a case where an end instruction is given to the center control unit 31 by the user is described. Furthermore, a shift of the state to State B in a case where an error has been caused in any one of all the resources (apparatuses) constituting the imaging system is described.

(Action Example of Imaging System Based on Scenario)

An action example of the imaging system based on the scenario described above will be hereinafter described.

Note that the action of the imaging system based on the scenario according to the present embodiment may be executed only in a case where a specific imaging mode is set. For example, the specific imaging mode may be set in response to a trigger of detection of the objects (each of the lecturer L1 and the auditor A1) in the camera images, or may be set in accordance with an operation by the user. Alternatively, the specific imaging mode may be set in response to a trigger of a lecture start time set beforehand.

Figure 9:
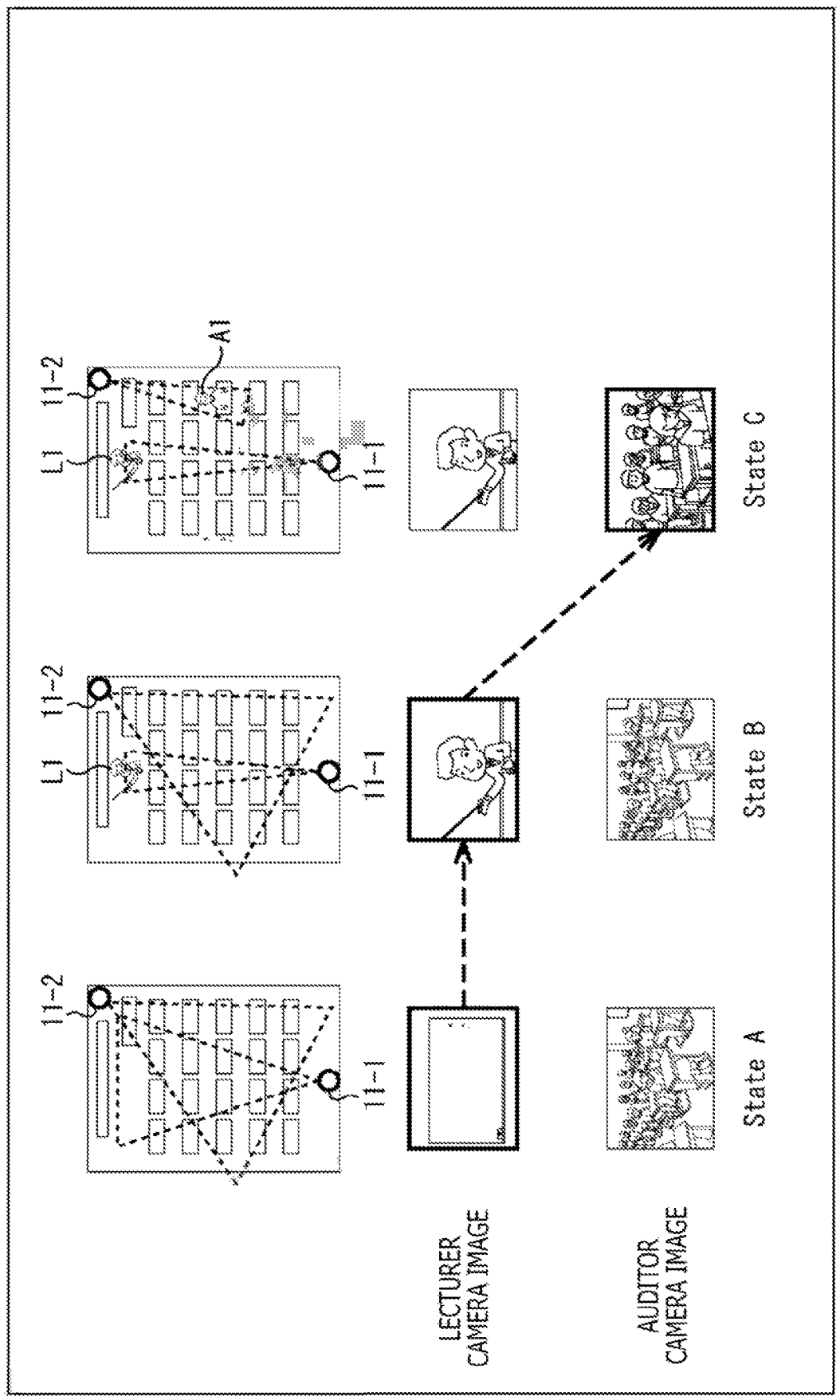
FIG. 9 is a diagram depicting an action example of the imaging system based on the scenario.

FIG. 9 depicts a scene from a time when the lecturer L1 stands on the platform to a time when one of the auditors A1 stands up to ask a question in the imaging system in FIG. 1, and corresponds to a shift from State A to State C of the scenario described above. As depicted in FIG. 9, note that the lecturer camera 11-1 in this example is disposed in a rear central part of the classroom where a lecture is given to image the lecturer L1, while the auditor camera 11-2 is disposed in a front right part of the classroom to image the entire auditors A1.

In the figures each depicting an action example of the imaging system based on the scenario, it is hereinafter assumed that the upper row depicts a top view of the classroom where a lecture is given for each State, and that the middle and lower rows depict a lecturer camera image and an auditor camera image, respectively, for each State. The top view of the classroom depicts angles of view (imaging ranges) of the lecturer camera 11-1 and the auditor camera 11-2 each indicated by a broken line, and positions of the lecturer L1 and the auditor A1. In addition, an image surrounded by a thick frame and connected by a thick broken arrow in each of the lecturer camera image and the auditor camera image indicates an image outputted from the switcher 33.

Initially, in response to an instruction of execution of the scenario is issued from the user to the controller 13 (center control unit 31) via the input/output apparatus 14, the state shifts from EP (Entry Point) to State A. At this time, the center control unit 31 instructs the lecturer camera controller 12-1, the auditor camera controller 12-2, and the switcher 33 to perform actions described in Behavior of State A (FIG. 6).

In response to this instruction, the lecturer camera controller 12-1 issues a camera control signal to instruct the lecturer camera 11-1 to perform fixed imaging on the Wide side, and also executes moving body detection in a state that the preset position is set to the platform in the lecturer camera image as depicted in State A in FIG. 9.

In addition, the auditor camera controller 12-2 issues a camera control signal to instruct the auditor camera 11-2 to perform fixed imaging on the Wide side.

Thereafter, the switcher 33 outputs the lecturer camera image surrounded by the thick frame.

When the lecturer camera controller 12-1 detects the moving body (lecturer L1) at the preset position (platform) in the lecturer camera image in this state, the state shifts to State B as described in Event of State A (FIG. 6). At this time, the center control unit 31 instructs the lecturer camera controller 12-1, the auditor camera controller 12-2, and the switcher 33 to perform actions described in Behavior of State B (FIG. 6).

In response to this instruction, the lecturer camera controller 12-1 executes tracking of the lecturer L1 in the lecturer camera image as indicated in State B in FIG. 9. The lecturer camera controller 12-1 also issues a camera control signal to instruct the lecturer camera 11-1 to perform pan-tilt imaging on the Tele side to capture the lecturer L1 at an appropriate angle of view on the basis of a tracking result. The appropriate angle of view herein is an angle of view for capturing a bust-up shot of the lecturer L1.

In addition, the auditor camera controller 12-2 issues a camera control signal to instruct the auditor camera 11-2 to perform fixed imaging on the Wide side continuously from State A, and executes gesture (standing up) detection in the auditor camera image.

Thereafter, the switcher 33 outputs the lecturer camera image surrounded by the thick frame continuously from State A.

When the auditor camera controller 12-2 detects a gesture (standing up) in the auditor camera image in this state, the state shifts to State C as described in Event of State B (FIG. 6). At this time, the center control unit 31 instructs the lecturer camera controller 12-1, the auditor camera controller 12-2, and the switcher 33 to perform actions described in Behavior of State C (FIG. 7).

In response to this instruction, the lecturer camera controller 12-1 continues an action similar to the action in State B as depicted in State C in FIG. 9.

In addition, the auditor camera controller 12-2 executes tracking of the auditor A1 in the auditor camera image. The auditor camera controller 12-2 also issues a camera control signal to instruct the auditor camera 11-2 to perform pan-tilt imaging on the Tele side to capture the auditor A1 at an appropriate angle of view on the basis of a tracking result. The appropriate angle of view herein is an angle of view for capturing a bust-up shot of the auditor A1. In addition, the auditor camera controller 12-2 executes gesture (sitting down) detection of the standing auditor A1 in the auditor camera image.

Thereafter, the switcher 33 switches the lecturer camera image to the auditor camera image surrounded by the thick frame, and outputs this auditor camera image.

This state shifts to any one of State D, State E, or State B in accordance with an action result of the auditor camera controller 12-2 as described in Event of State C (FIG. 7).

Figure 10:
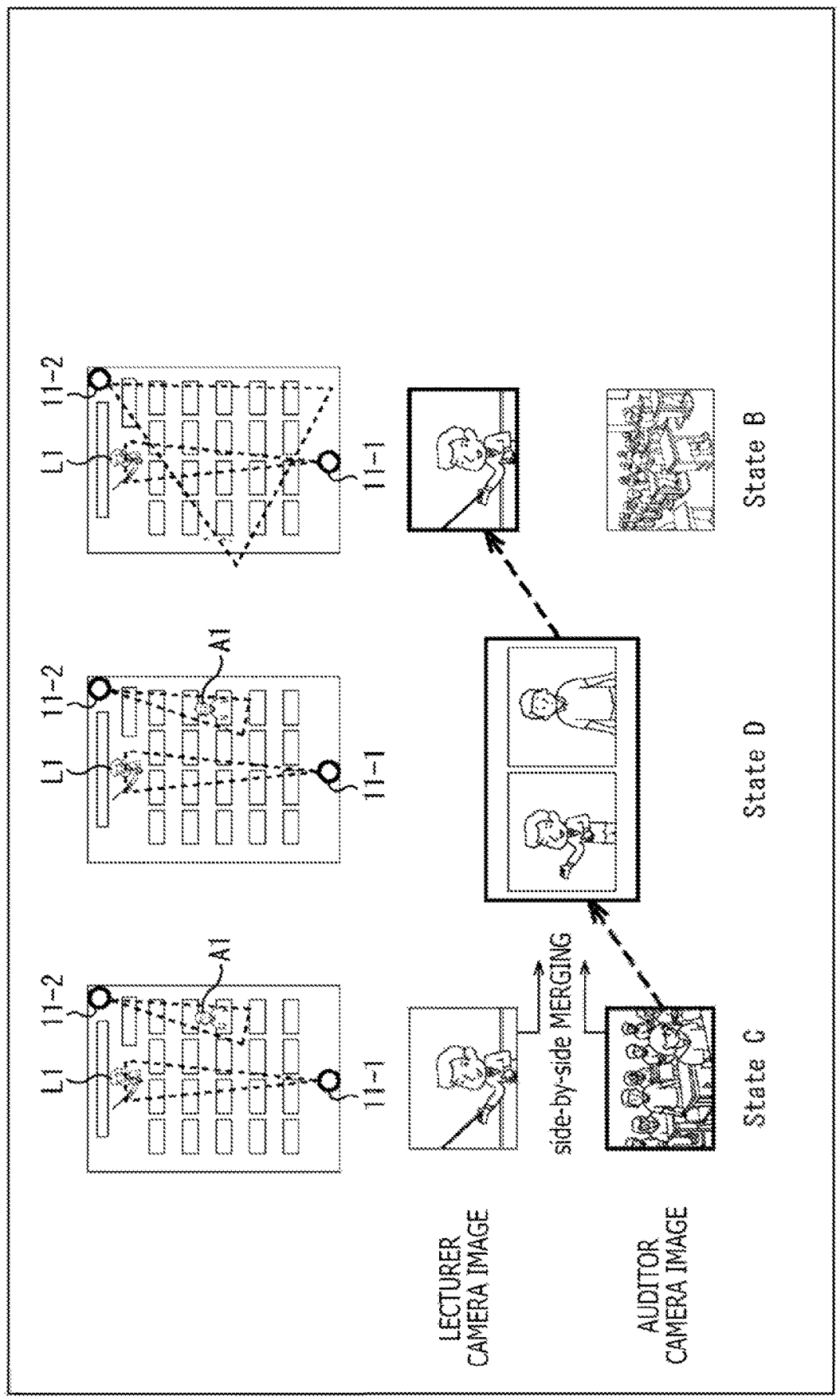
FIG. 10 is a diagram depicting an action example of the imaging system based on the scenario.

FIG. 10 depicts a scene from a time when the auditor A1 stands up to a time when the auditor A1 answers a question on the spot and sits down in the imaging system in FIG. 1, and corresponds to a shift in the order of State C, State D, and State B of the scenario described above.

More specifically, in State C in FIG. 10, the state shifts to State D in a case where the auditor camera controller 12-2 determines that a tracking target moves only by a distance shorter than a fixed distance for a fixed period or longer (the auditor A1 answers a question while standing up at the seat) in the auditor camera image as described in Event of State C (FIG. 7). At this time, the center control unit 31 instructs the lecturer camera controller 12-1, the auditor camera controller 12-2, and the switcher 33 to perform actions described in Behavior of State D (FIG. 7).

In response to this instruction, the lecturer camera controller 12-1 continues an action similar to the action in State C as depicted in State D in FIG. 10.

In addition, the auditor camera controller 12-2 executes gesture (sitting down) detection of the standing auditor A1 in the auditor camera image.

Thereafter, the switcher 33 merges the lecturer camera image and the auditor camera image side-by-side and outputs the merged image. In this manner, the audience can check an exchange between the lecturer L1 and the auditor A1 in one screen even though the lecturer L1 and the auditor A1 are imaged by the different cameras 11.

When the auditor camera controller 12-2 detects a gesture (sitting down) in the auditor camera image in this state, the state again shifts to State B as described in Event of State D (FIG. 7). In response to this shift, the switcher 33 switches the lecturer camera image and the auditor camera image from the image obtained by side-by-side merging to the lecturer camera image surrounded by the thick frame, and outputs this lecturer camera image as depicted in State B in FIG. 10.

Figure 11:
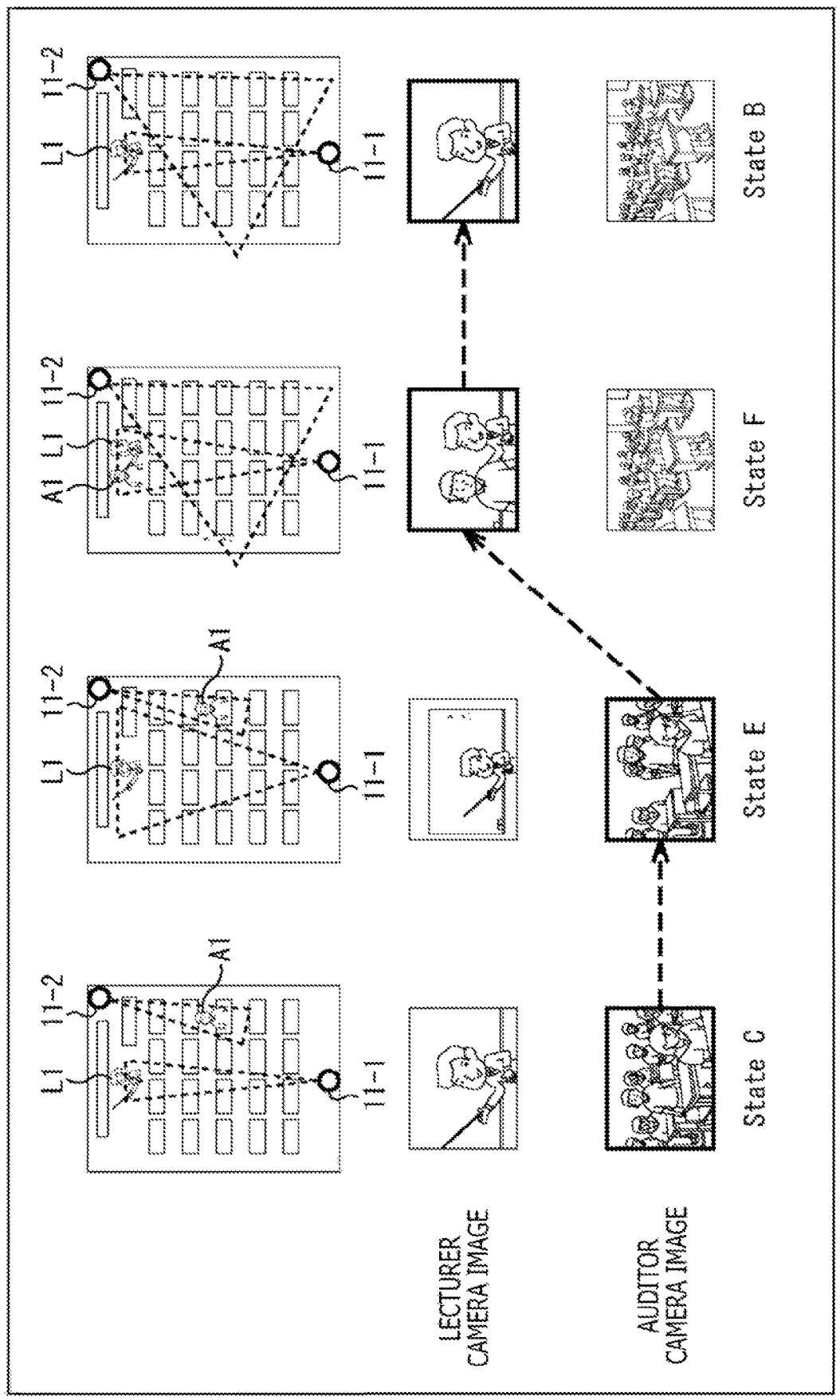
FIG. 11 is a diagram depicting an action example of the imaging system based on the scenario.

FIG. 11 depicts a scene from a time when the auditor A1 stands up, moves to the platform, and answers a question to a time when the auditor A1 returns to the seat and sits down in the imaging system in FIG. 1, and corresponds to a shift in the order of State C, State E, State F, and State B of the scenario described above.

More specifically, in State C in FIG. 11, the state shifts to State E in a case where the auditor camera controller 12-2 determines that a tracking target moves by a distance of a fixed distance or longer in a period shorter than a fixed period (the auditor moves to the platform to answer a question) in the auditor camera image as described in Event of State C (FIG. 7). At this time, the center control unit 31 instructs the lecturer camera controller 12-1, the auditor camera controller 12-2, and the switcher 33 to perform actions described in Behavior of State E (FIG. 8).

In this manner, as depicted in State E in FIG. 11, the lecturer camera controller 12-1 issues a camera control signal to instruct the lecturer camera 11-1 to perform pan-tilt imaging on the Wide side. In addition, the lecturer camera controller 12-1 executes moving body detection in the lecturer camera image. Even in a case where not only the lecturer L1 but also the auditor A1 stands on the platform, both the auditor A1 and the lecturer L1 can be captured by pan-tilt imaging on the Wide side using the lecturer camera 11-1.

In addition, the auditor camera controller 12-2 issues a camera control signal to instruct the auditor camera 11-2 to perform pan-tilt imaging on the Tele side continuously from State C, and executes tracking of the auditor A1 in the auditor camera image.

Thereafter, the switcher 33 outputs the auditor camera image surrounded by the thick frame continuously from State C.

When the lecturer camera controller 12-1 detects a plurality of the moving bodies (i.e., two persons as the lecturer L1 and the auditor A1) at the preset position (platform) in the lecturer camera image in this state, the state shifts to State F as described in Event of State E (FIG. 8). At this time, the center control unit 31 instructs the lecturer camera controller 12-1, the auditor camera controller 12-2, and the switcher 33 to perform actions described in Behavior of State F (FIG. 8).

In response to this instruction, the lecturer camera controller 12-1 executes tracking of each of the lecturer L1 and the auditor A1 in the lecturer camera image as indicated in State F in FIG. 11. The lecturer camera controller 12-1 also issues a camera control signal to instruct the lecturer camera 11-1 to perform pan-tilt imaging on the Tele side to capture the objects at an appropriate angle of view on the basis of a tracking result. The appropriate angle of view herein is an angle of view for capturing both the lecturer L1 the auditor A1.

In addition, the auditor camera controller 12-2 issues a camera control signal to instruct the auditor camera 11-2 to perform fixed imaging on the Wide side to have the same angle of view as that angle of State B as a subsequent shift destination. Moving body detection and tracking are not executed herein.

Thereafter, the switcher 33 switches the auditor camera image to the lecturer camera image surrounded by the thick frame, and outputs this lecturer camera image.

When the lecturer camera controller 12-1 determines that the auditor has moved to the outside of the preset position (platform) in the lecturer camera image in this state, the state again shifts to State B as described in Event of State F (FIG. 8). In response to this shift, the switcher 33 outputs the lecturer camera image surrounded by the thick frame continuously from State F as depicted in State B in FIG. 11.

According to the configuration described above, tracking of a lecturer and detection of an action of an auditor such as standing up and sitting down, and also capturing the lecturer and the auditor at an appropriate angle of view are achievable using only two cameras. More specifically, one of the lecturer camera and the auditor camera zooms in to capture an image an object, while the other camera zooms out to detect the object with control linkage between the two cameras. The respective images are switchable in appropriate timing and output.

Accordingly, providable is such a lecture capture system which achieves cost reduction by eliminating the necessity of providing an overhead camera for detecting an object in addition to a tracking camera for tracking and imaging an object.

(Scenario Editing Example)

The scenario described above is editable by the user.

According to the scenario described above, the image to be outputted is switched from the lecturer camera image to the auditor camera image (State B→State C) in a case where the auditor A1 stands up to ask a question as described with reference to FIG. 9.

Figure 12:
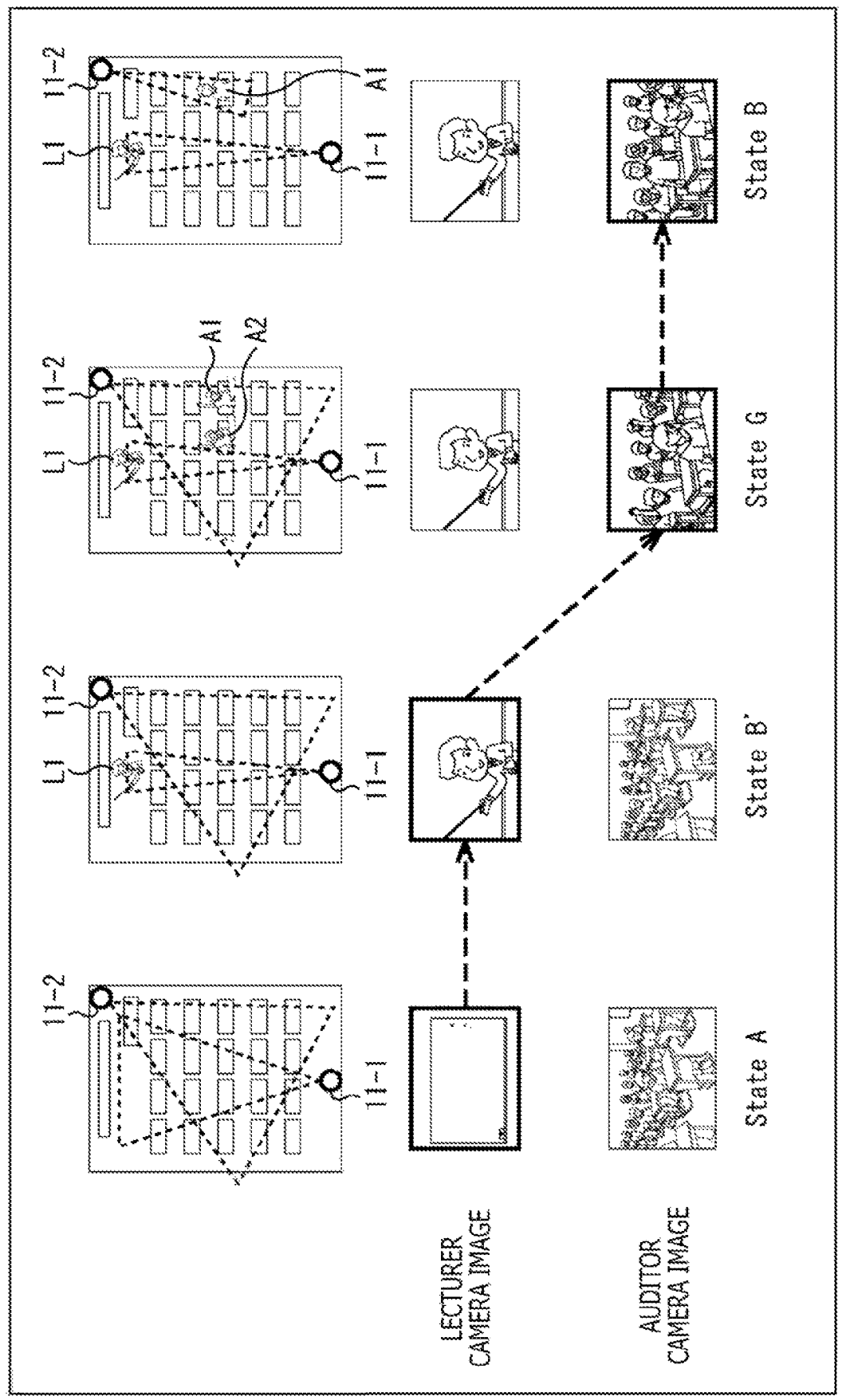
FIG. 12 is a diagram depicting an action example of the imaging system based on the edited scenario.

By allowing editing of the scenario for the foregoing action of the imaging system, the image to be outputted when the auditor A1 raises his or her hand to ask a question is allowed to switch from the lecturer camera image to the auditor camera image as depicted in FIG. 12 (State B'→State G).

Figure 13:
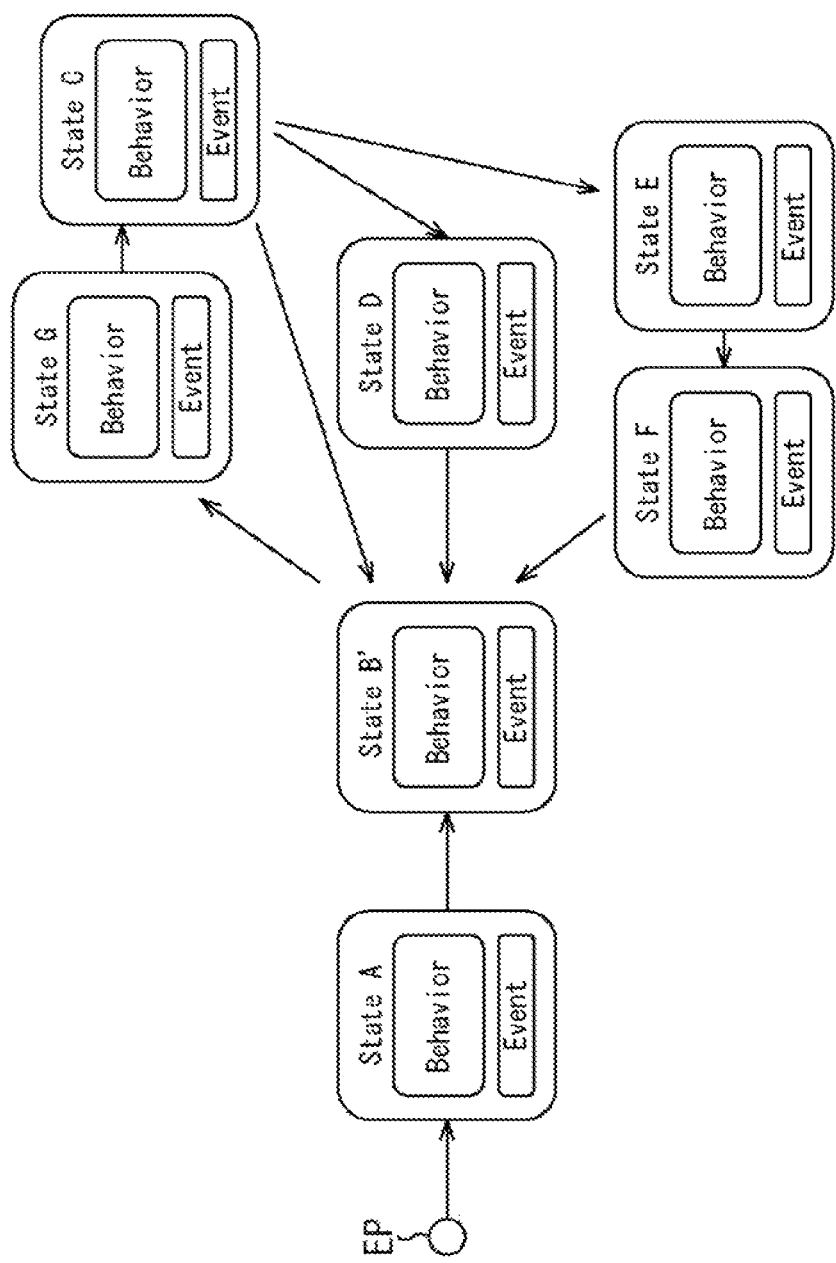
FIG. 13 is a diagram depicting a description example of the scenario after editing.

FIG. 13 is a diagram depicting a description example of the scenario after editing.

According to the scenario in FIG. 13, State B in the scenario in FIG. 5 is switched to State B', and State G is newly added.

FIG. 14 depicts details of State B' and State G.

As an action of the auditor camera controller 12-2 to be described in Behavior of State B', "execute gesture (standing up) detection" described in Behavior of State B (FIG. 6) is switched to "execute gesture (raising hand) detection."

In addition, as a shift to be described in Event of State B' in a case where the auditor camera controller 12-2 detects a gesture (standing up), a shift to "State C" is switched to a shift to "state G."

As actions of the lecturer camera controller 12-1, pan-tilt imaging on the Tele side, and execution of tracking (by the lecturer camera 11-1) are described in Behavior of State G newly added. Moreover, as actions of the auditor camera controller 12-2, fixed imaging on the Wide side, and execution of gesture (standing up) detection (by the auditor camera 11-2) are described. Furthermore, as an action of the switcher 33, output of the auditor camera image is described.

A shift of the state to State C in a case where the auditor camera controller 12-2 detects a gesture (standing up) is described in Event of State G.

More specifically, when the auditor camera controller 12-2 detects a gesture (raising hand) in the auditor camera image in State B' in FIG. 12, the state shifts to State G as described in Event of State B' (FIG. 14). At this time, the center control unit 31 instructs the lecturer camera controller 12-1, the auditor camera controller 12-2, and the switcher 33 to perform actions described in Behavior of State G (FIG. 14).

In response to this instruction, the lecturer camera controller 12-1 continues an action similar to the action in State B' as depicted in State G in FIG. 12.

In addition, the auditor camera controller 12-2 issues a camera control signal to instruct the auditor camera 11-2 to perform fixed imaging on the Wide side continuously from State B', and executes gesture (standing up) detection in the auditor camera image.

Thereafter, the switcher 33 switches the lecturer camera image to the lecturer camera image surrounded by the thick frame, and outputs this lecturer camera image.

When the auditor camera controller 12-2 detects a gesture (standing up) in the auditor camera image in this state as described in Event of State G (FIG. 14), the state shifts to State C. In response to this shift, the switcher 33 outputs the lecturer camera image surrounded by the thick frame continuously from State G as indicated in State C in FIG. 12.

The action of the entire imaging system can be changed by editing the scenario in the manner described above.

(Example of GUI used for Editing of Scenario)

Editing of the scenario in the manner described above is achieved by presenting GUI (Graphical User Interface) to the user using the controller 13 (center control unit 31). The controller 13 (center control unit 31) can add or delete States, and edit (change) States (description contents of Behaviors and Events) included in the existing scenario in accordance with an operation performed by the user through a keyboard or a mouse provided as the input/output apparatus 14.

Figure 15:
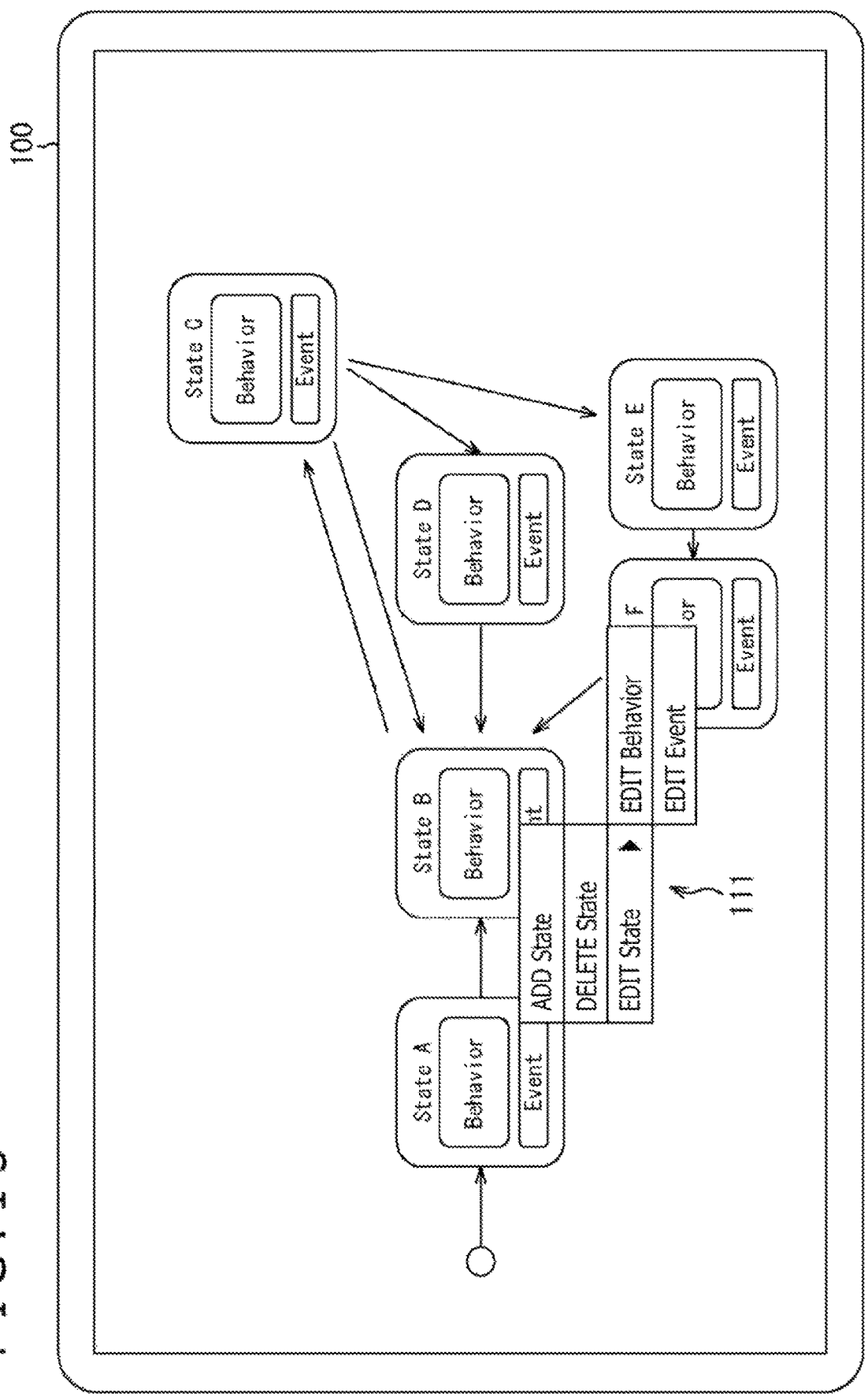
FIG. 15 is a diagram depicting an example of GUI used for editing of the scenario.

FIG. 15 is a diagram depicting an example of an editing screen of the scenario displayed as GUI used for editing of the scenario in a display provided as the input/output apparatus 14.

An editing screen of the scenario described with reference to FIG. 5 is displayed in a display 100 in FIG. 15.

In FIG. 15, a context menu 111 is displayed in response to a right click operation or the like in a state where State B constituting the scenario is selected by the mouse or the like. The context menu 111 displays three items, i.e., "add State," "delete State," and "edit State." A triangular arrow is displayed at the right end of the item "edit State," and a sub menu is displayed on the right side of the arrow. Two items, i.e., "edit Behavior" and "edit Event" are displayed in the sub menu.

Figure 16:
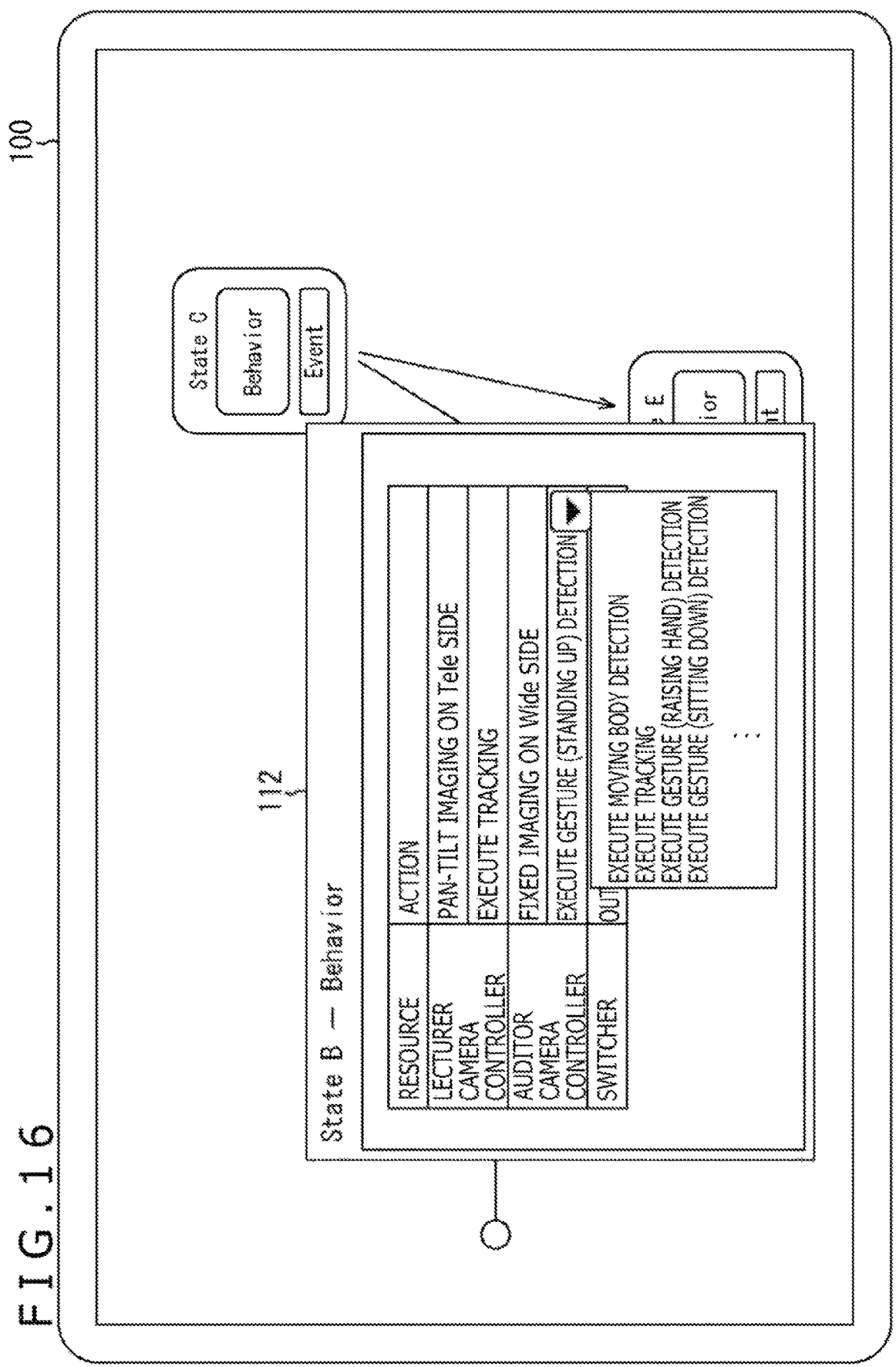
FIG. 16 is a diagram depicting an example of GUI used for editing of the scenario.

If "edit Behavior" of the sub menu is selected in FIG. 15, a pop-up window 112 for editing Behavior of State B is displayed in the editing screen as depicted in FIG. 16. As Behavior of State B, a list describing contents of actions of the respective apparatuses is displayed in the pop-up window 112 in FIG. 16.

A pull-down menu in FIG. 16 is displayed by selecting an item portion of an action performed by the auditor camera controller 12-2 (execute gesture (standing up) detection) using the mouse or the like. Actions executable by the auditor camera controller 12-2, such as "execute moving body detection," "execute tracking," "execute gesture (raising hand) detection," and "execute gesture (sitting down) detection" are displayed in the pull-down menu as choices.

The choices displayed in the pull-down menu are actions executable in accordance with the contents and the number of the functions of the respective apparatuses of which the controller 13 (center control unit 31) inquires regarding these contents and number. Moreover, the choices to be displayed in the pull-down menu may be manually added by the user on the basis of specifications of the respective apparatuses.

Figure 17:
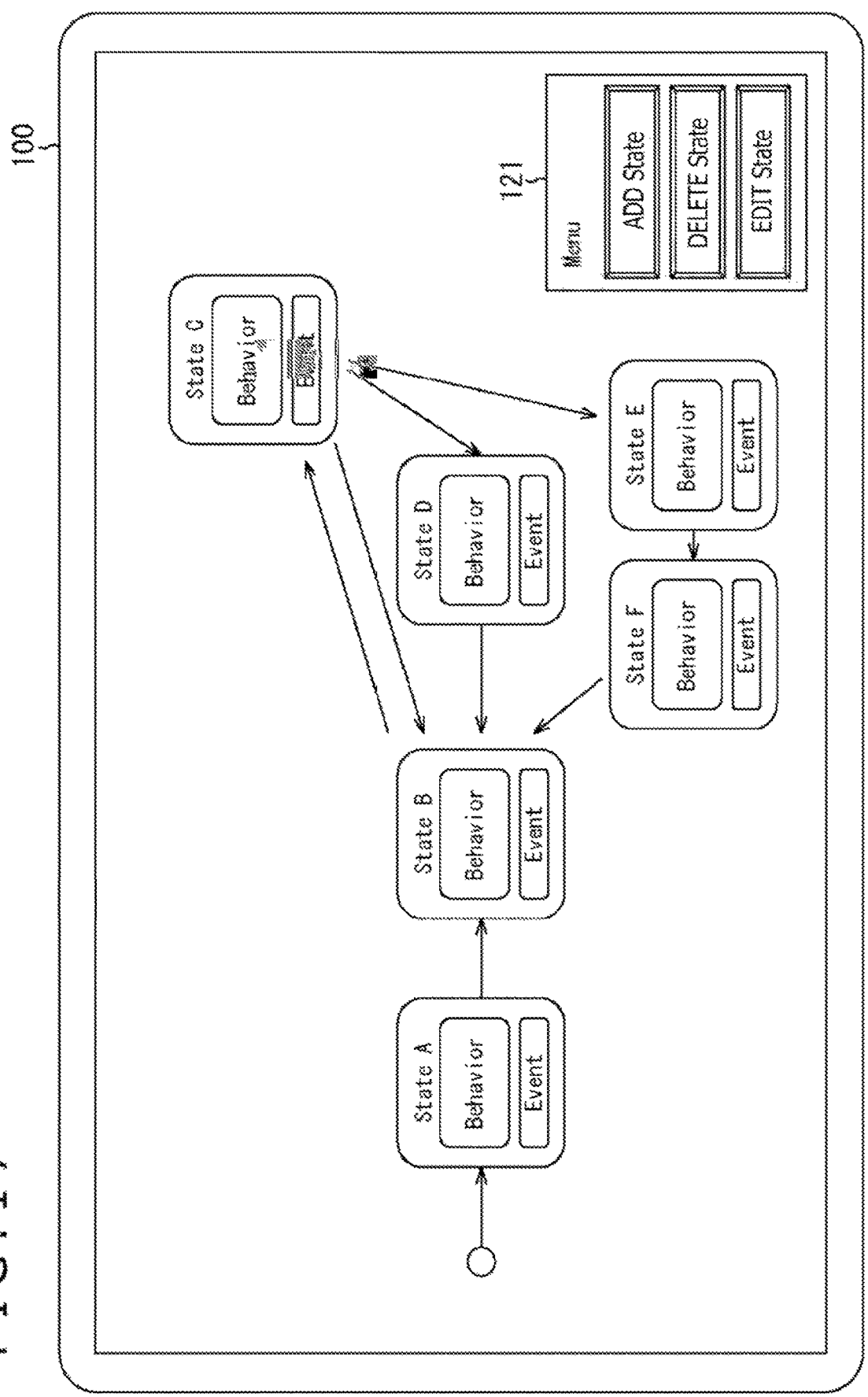
FIG. 17 is a diagram depicting an example of GUI used for editing of the scenario.

Note that the editing screen of the scenario may be such a screen which includes a menu button group 121 displayed in a lower right region of the screen in response to a right click operation or the like in the editing screen using the mouse as depicted in FIG. 17, for example, as well as the example depicted in FIG. 15. Alternatively, the menu button group 121 may be displayed as default at a fixed position in the editing screen of the scenario.

Furthermore, the user can expand the functions of the respective apparatuses. For example, the user can newly define and register types of gesture detected by the gesture detection unit 22 of the camera controller 12.

Figure 18:
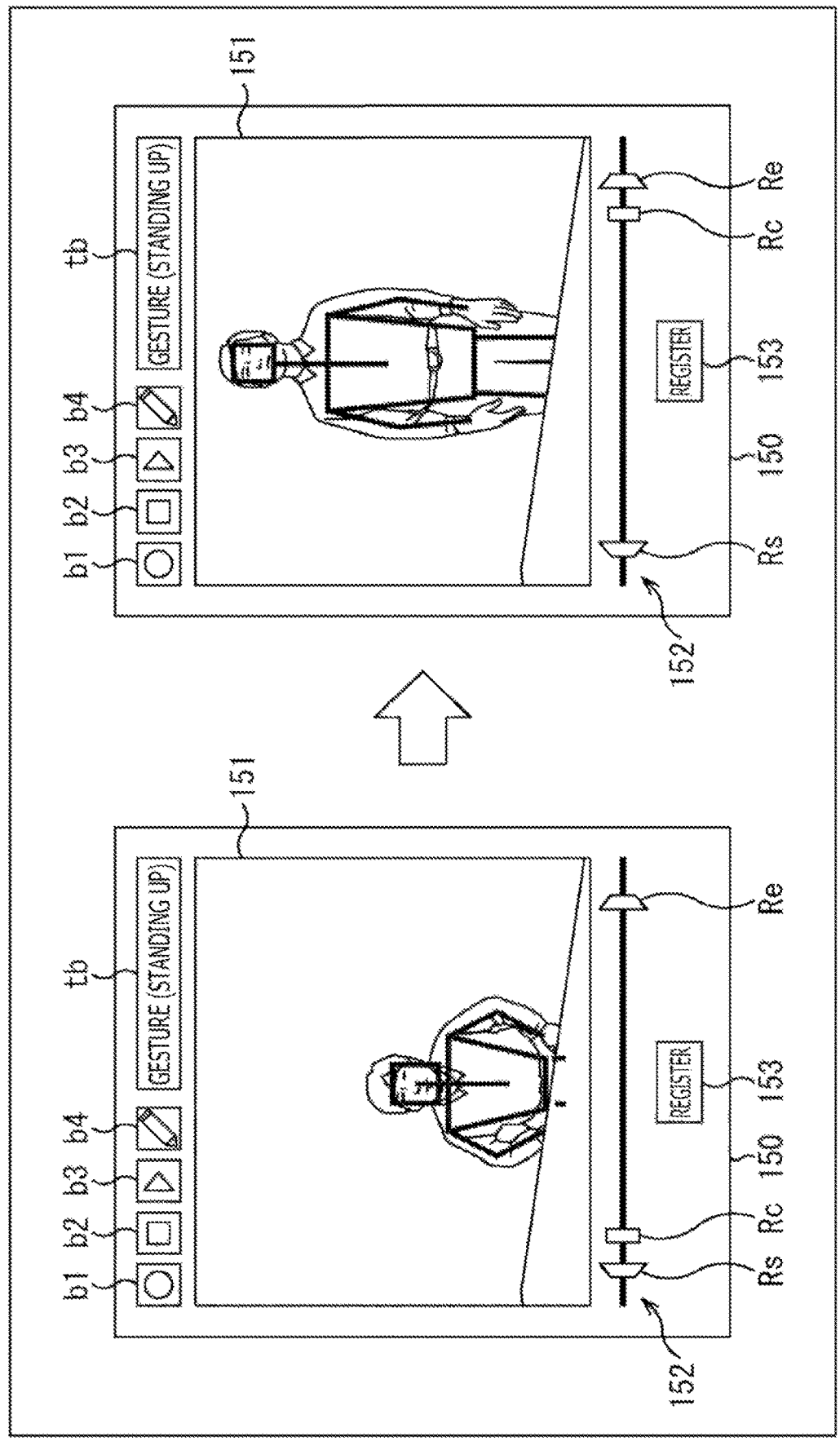
FIG. 18 is a diagram depicting an example of GUI used for defining and registering a gesture.

FIG. 18 is a diagram depicting an example of a gesture registration screen as GUI used for defining and registering gestures, and displayed in the display provided as the input/output apparatus 14.

FIG. 18 depicts a state of registration of a gesture corresponding to a standing-up action in a gesture registration screen 150. The gesture registration screen 150 is displayed in response to selection of a gesture definition and registration mode by the user using software, for example.

An image display section 151 is included in the gesture registration screen 150. An image of any object (person) captured by the cameras 11 is displayed in the image display section 151. A person in a sitting state appears in the image display section 151 of the gesture registration screen 150 on the left side in FIG. 18, while the person in a standing state shifted from the sitting state appears in the image display section 151 of the gesture registration screen 150 on the right side in FIG. 18.

The gesture detection unit 22 of the camera controller 12 recognizes a posture of the person in the image, generates skeletal structure information indicated by thick lines in the image display section 151, and supplies the generated skeletal structure information to the center control unit 31 via the camera control unit 24. The switcher 33 superimposes the skeletal structure information acquired by the center control unit 31 on an image received from the camera controller 12, and displays the superimposed information in the image display section 151 of the gesture registration screen 150. The skeletal structure information may be superimposed on the image at the camera controller 12.

Buttons b1, b2, b3, and b4, and a text box tb are provided above the image display section 151 in the gesture registration screen 150.

The button b1 is a button for starting recording of the image displayed in the image display section 151, while the button b2 is a button for stopping recording of the image. The button b3 is a button for reproducing the recorded image, while the button b4 is a button for editing skeletal structure information in the reproduced image. The user can correct the skeletal structure information in the image reproduced and displayed in the image display section 151 by operating the button b4 using the mouse or the like.

The text box tb is a region to which a name of a gesture to be registered is inputted. The user can determine a name of a gesture to be registered by operating the keyboard or the like.

A timeline 152 and a registration button 153 are provided below the image display section 151 in the gesture registration screen 150.

The timeline 152 is an object which indicates a reproduction position of the image displayed in the image display section 151. A cursor Rc on a bar indicates a current reproduction position in the entire image in terms of time.

In the recorded image, an icon Rs on the bar of the timeline 152 represents a start time of an image actually used for gesture detection in terms of time, and an icon Re represents an end time of the image actually used for gesture detection in terms of time. The positions of the icons Rs and Re on the bar of the timeline 152 can be set by the user.

The registration button 153 is a button for registering the skeletal structure information included in the recorded image in association with a gesture name. A series of changes of the skeletal structure information included in the image from the start position indicated by the icon Rs to the end position indicated by the icon Re in the recorded image are registered by operating the registration button 153 together with the gesture name inputted to the text box tb.

The gesture name registered in the above manner is added to and displayed in the pull-down menu in FIG. 16. The gesture detection unit 22 can detect a gesture identical or similar to a newly registered gesture by changing the action of the camera controller 12 to execution of detection of the added gesture during editing of the scenario (Behavior).

Note that movement of the object in the camera image and the skeletal structure information included in the recorded image may be compared with each other in time series, or in units of predetermined frame in the gesture detection performed by the gesture detection unit 22.

According to the example described in FIG. 18, the standing-up action is registered as the gesture. However, in view of the fact that a series of posture changes are recordable, any gesture is allowed to be registered.

Moreover, while the example of gesture registration is described herein, board extraction patterns employed by a board extraction unit 211 (FIG. 20) described below, and faces used for identification by a face detection/identification unit 351 described below may be similarly registered.

According to the configuration described above, the user can implement a software structure and GUI capable of defining and editing the actions of the entire system. More specifically, the user can add and delete action procedures of the system by combining States, or change shifts between States in the scenario which describes the actions (Behaviors) of respective resources defining States, and Events for shifting subsequent States.

Accordingly, the user (lecturer) is allowed to give lectures in accordance with a style of each lecture, and flexibly cope with changes of the system configuration.

2. SECOND EMBODIMENT (Configuration Example of Imaging System)

Figure 19:
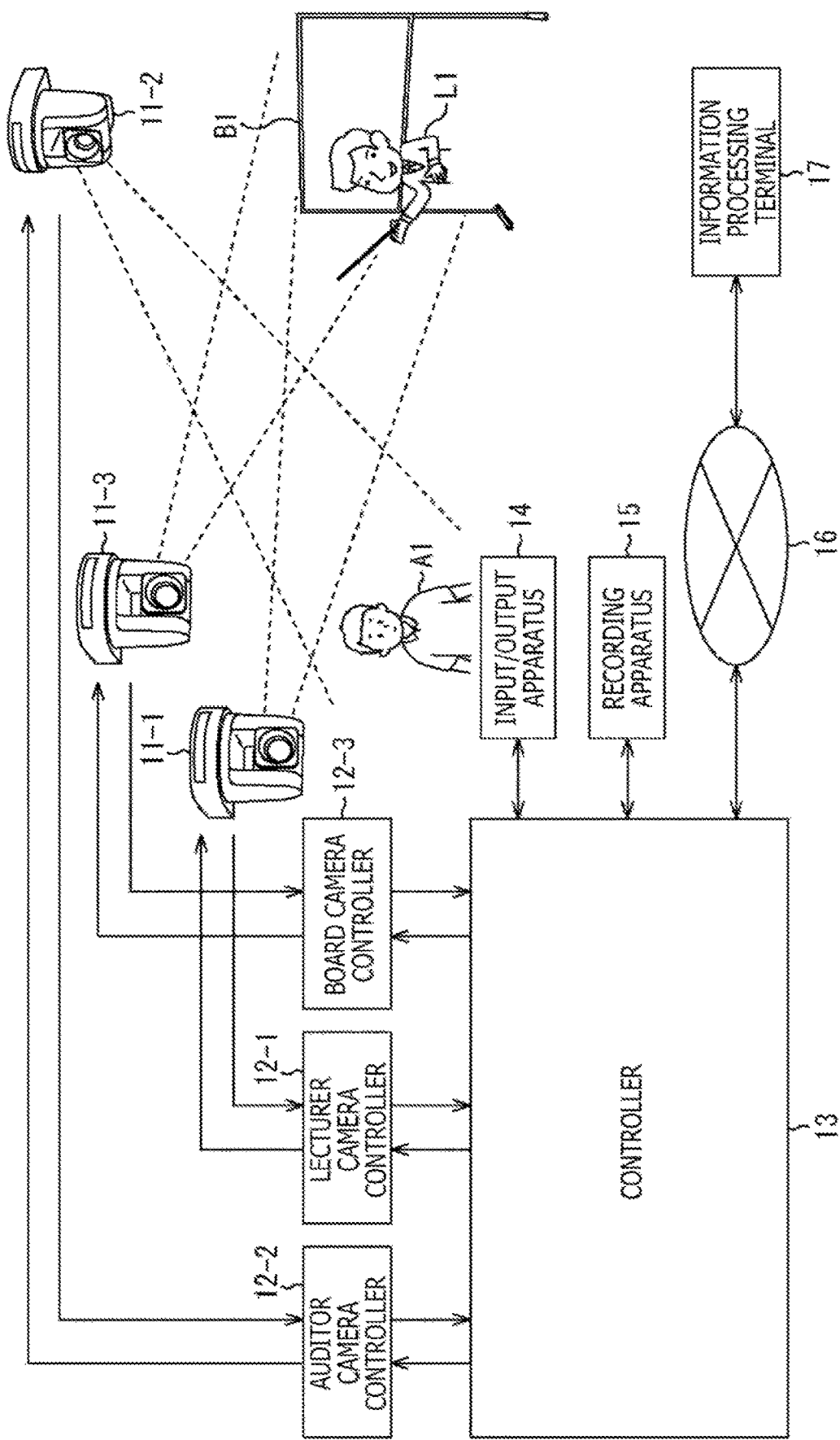
FIG. 19 is a diagram depicting another configuration example of the imaging system.

FIG. 19 is a diagram depicting another configuration example of the imaging system to which the present technology is applied.

An imaging system in FIG. 19 includes a board camera 11-3 and a board camera controller 12-3 in addition to the configuration of the imaging system in FIG. 1.

The board camera 11-3 captures an image of a blackboard (or whiteboard) B1 used by the lecturer L1 during a lecture under control by the board camera controller 12-3, and outputs the obtained image (board camera image) to the board camera controller 12-3.

The board camera 11-3 is provided in such a position as to image substantially in the same direction as the direction of the lecturer camera 11-1.

The board camera 11-3 may have a configuration similar to the configurations of the lecturer camera 11-1 and the auditor camera 11-2 except that an object corresponding to an imaging target is the blackboard B1. Accordingly, similarly to the lecturer camera 11-1 and the auditor camera 11-2, the board camera 11-3 is also configured as a PTZ camera which has a function of mechanical panning and tilting, and also is capable of performing optical and electronical zooming.

The board camera controller 12-3 controls the board camera 11-3 under control by the controller 13 to acquire a board camera image outputted from the board camera 11-3, and outputs the acquired image to the controller 13. In addition, the board camera controller 12-3 receives an instruction of calculation and control from the controller 13, and outputs a result of calculation and control to the controller 13.

The board camera controller 12-3 basically has a configuration similar to the configurations of the lecturer camera controller 12-1 and the auditor camera controller 12-2 except that the control target is the board camera 11-3, but is different in that a board extraction function described below is provided.

(Functional Configuration Example of Board Camera Controller)

Figure 20:
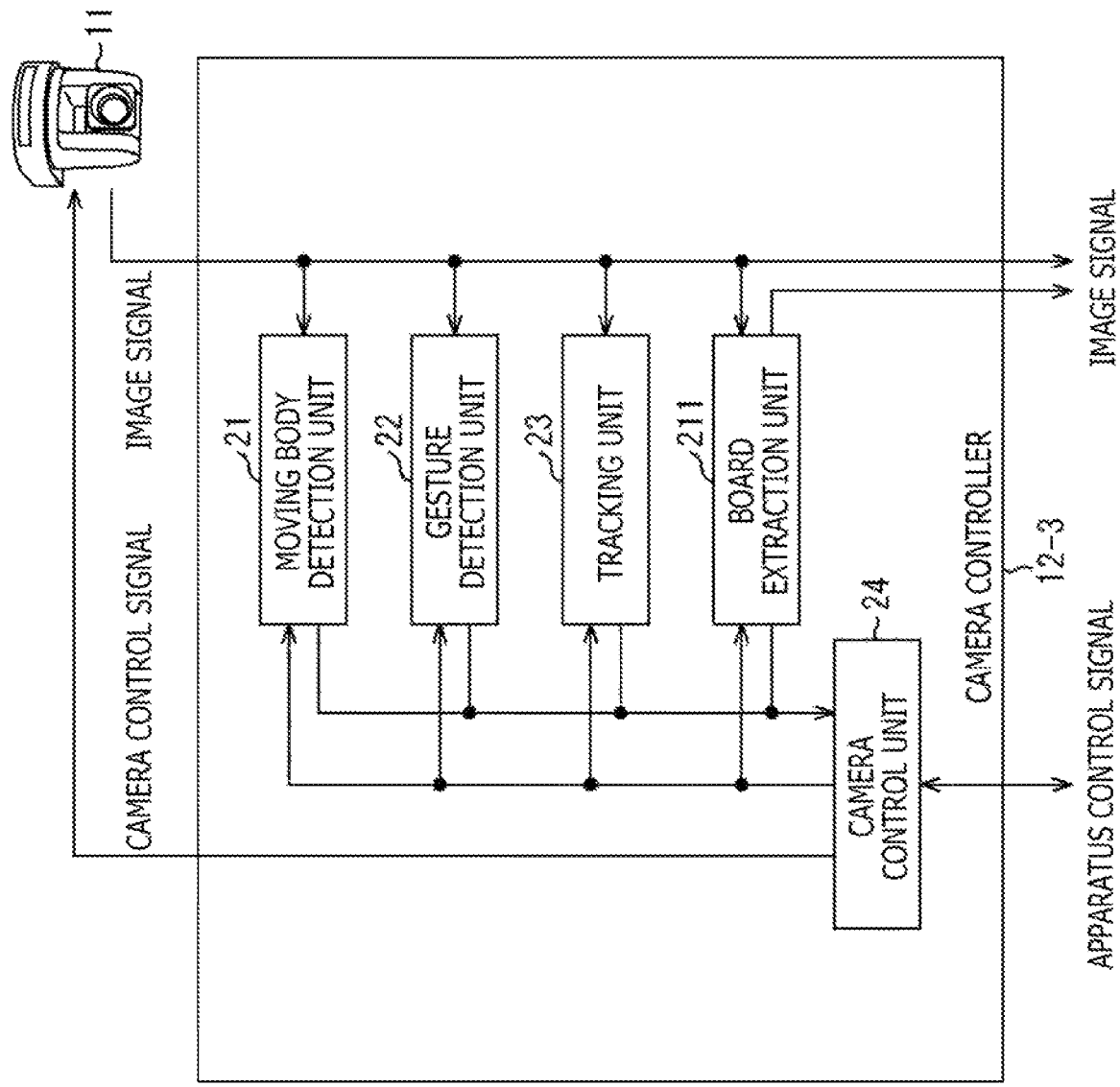
FIG. 20 is a block diagram depicting a functional configuration example of a camera controller.

FIG. 20 is a block diagram depicting a functional configuration example of the board camera controller 12-3 described above.

The board camera controller 12-3 in FIG. 20 includes the board extraction unit 211 in addition to the configuration of the camera controller 12 in FIG. 2.

The board extraction unit 211 acquires a board camera image from the board camera 11-3, and executes a board extraction process for extracting contents written on the blackboard B1 from the board camera image under control by the camera control unit 24. While details of the board extraction process are not described herein, a board extraction result image resulting from the board extraction process is outputted to the controller 13 (switcher 33) as an image signal. In this case, the switcher 33 controls output of at least either respective camera images or the board extraction result image in accordance with the image of the object in each of the camera images, or the result of the board extraction process under control by the center control unit 31.

The board camera image includes not only the blackboard B1, but also the lecturer L1 who writes characters, graphs or the like on the blackboard B1. The board extraction unit 211 outputs the board extraction image while deleting the lecturer L1 from the board camera image, and increasing visibility of the characters, graphs or the like written on the board by reproducing and emphasizing these characters or the like.

Moreover, the board extraction unit 211 is capable of not only extracting the contents written on the board, but also storing a process where the lecturer L1 writes or deletes characters on the blackboard B1 in time series for recognition of timing of a writing start or a deleting start, and the written contents (characters, figures or the like).

(Description Example of Scenario)

Figure 21:
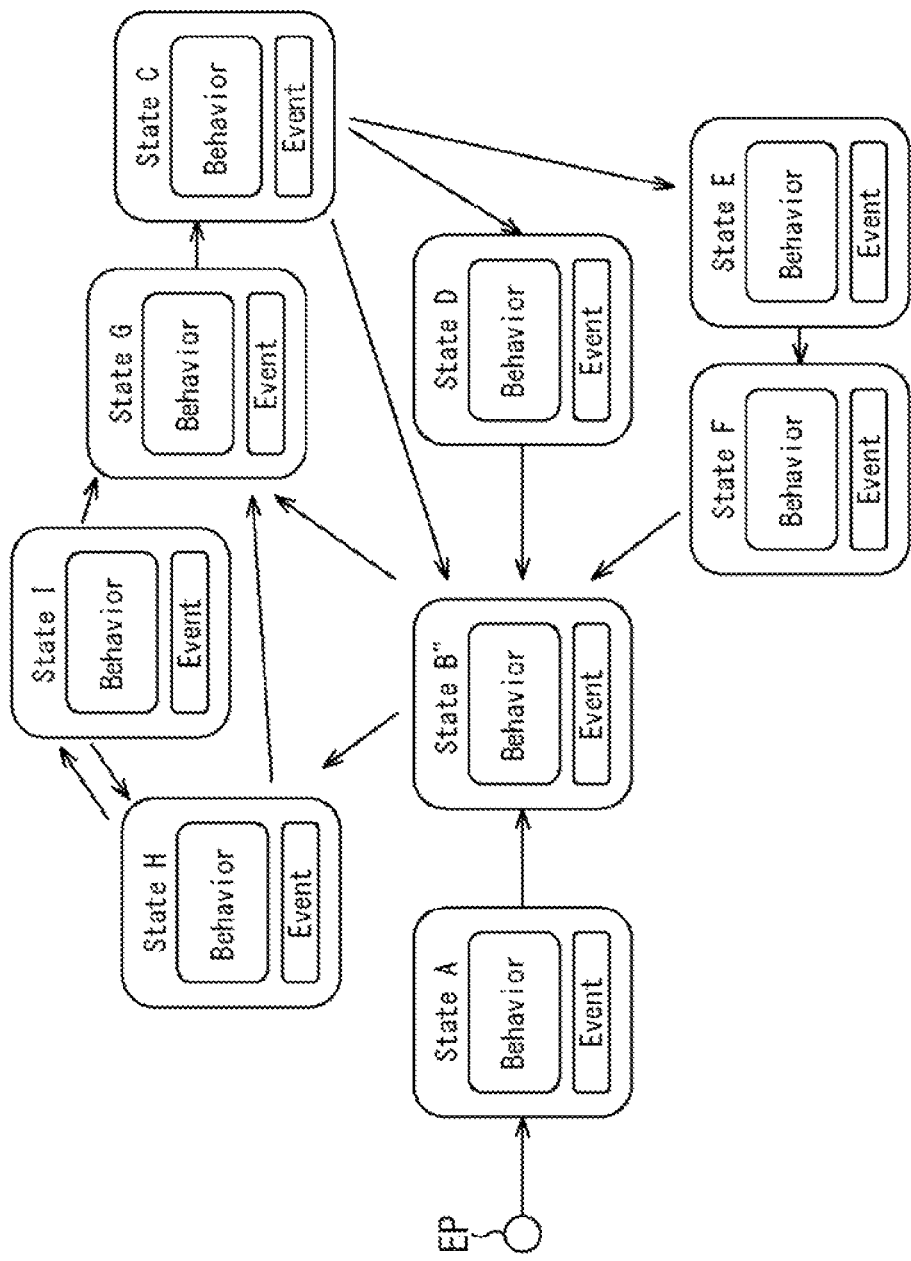
FIG. 21 is a diagram depicting a description example of a scenario.

FIG. 21 is a diagram depicting a description example of a scenario which defines actions of the imaging system in FIG. 19.

According to the scenario in FIG. 21, State B' in the scenario in FIG. 13 is switched to State B", and States H and I are newly added.

FIG. 22 is a diagram depicting details of State B", while FIG. 23 is a diagram depicting details of States H and I.

Actions of the board camera controller 12-3 are described in Behavior of State B" (FIG. 22) in addition to description similar to Behavior of State B' (FIG. 13). As the actions of the board camera controller 12-3, fixed imaging on the Wide side, and execution of board extraction (process) (by the board camera 11-3) are described in Behavior of State B".

A shift of the state to State H in a case where the board camera controller 12-3 detects writing to or deleting from the board is described in Event of State B" in addition to description similar to Behavior of State B' (FIG. 13).

As actions of the lecturer camera controller 12-1, fixed imaging on the Wide side, and execution of tracking (by the lecturer camera 11-1) are described in Behavior of State H (FIG. 23). Moreover, as actions of the auditor camera controller 12-2, fixed imaging on the Wide side, and execution of gesture (raising hand) detection (by the auditor camera 11-2) are described. Furthermore, as the actions of the board camera controller 12-3, fixed imaging on the Wide side, and execution of board extraction (by the board camera 11-3) are described. As an action of the switcher 33, output of a board extraction result image is described.

A shift of the state to State G in a case where the auditor camera controller 12-2 detects a gesture (raising hand) is described in Event of State H. Moreover, a shift of the state to State I in a case where the board camera controller 12-3 determines that writing to or deleting from the board is not detected for a fixed period or longer is described.

As actions of the lecturer camera controller 12-1, fixed imaging on the Tele side, and execution of tracking (by the lecturer camera 11-1) are described in Behavior of State I (FIG. 23). Moreover, as actions of the auditor camera controller 12-2, fixed imaging on the Wide side, and execution of gesture (raising hand) detection (by the auditor camera 11-2) are described. Furthermore, as the actions of the board camera controller 12-3, fixed imaging on the Wide side, and execution of board extraction (by the board camera 11-3) are described. As an action of the switcher 33, it is described that the lecturer camera image and the board extraction result image are merged side-by-side to be outputted.

A shift of the state to State G in a case where the auditor camera controller 12-2 detects a gesture (raising hand) is described in Event of State I. Moreover, a shift of the state to State H in a case where the board camera controller 12-3 detects writing to or deleting from the board is described.

(Action Example of Imaging System Based on Scenario)

Subsequently, an action example of the imaging system based on the scenario in FIG. 21 will be described.

The scenario in FIG. 21 is different from the scenario in FIG. 13 in that State B", State H, and State I are provided. Accordingly, state shifts between these States will be touched upon with reference to FIG. 24.

Figure 24:
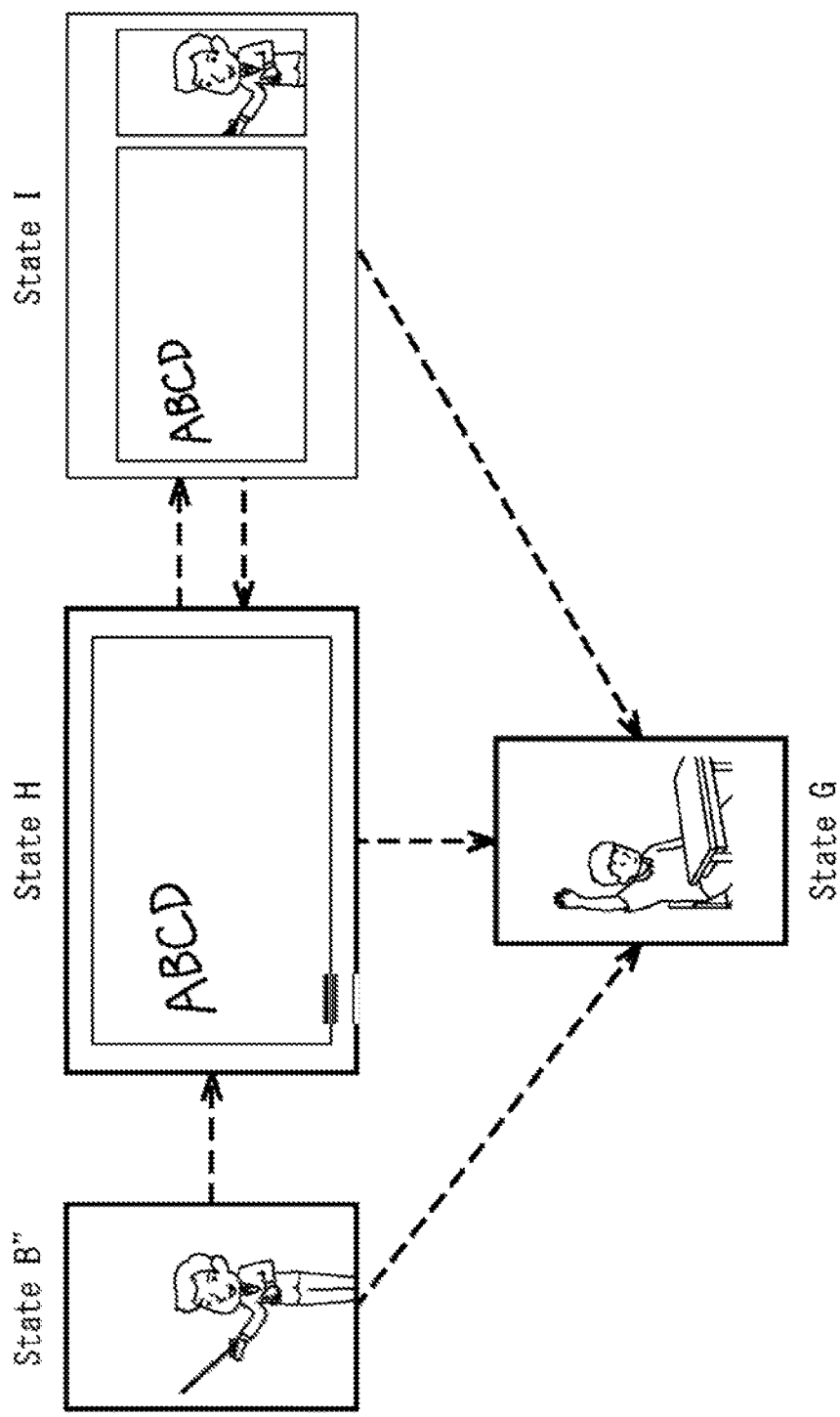
FIG. 24 is a diagram depicting an action example of the imaging system based on the scenario.

When the auditor camera controller 12-2 detects a gesture (raising hand) in the auditor camera image in State B" in FIG. 24, the state shifts to State G as described in Event of State B" (FIG. 22). In response to this shift, the switcher 33 switches the lecturer camera image to the auditor camera image, and outputs the auditor camera image as indicated in State G in FIG. 24.

On the other hand, when the board camera controller 12-3 detects writing to or deleting from the board in the board camera image, the state shifts to State H as described in Event of State B″ (FIG. 22). At this time, the center control unit 31 instructs the lecturer camera controller 12-1, the auditor camera controller 12-2, the board camera controller 12-3, and the switcher 33 to perform actions described in Behavior of State H (FIG. 23).

In response to this instruction, the switcher 33 switches the lecturer camera image to the board extraction result image, and outputs the board extraction result image as indicated in State H in FIG. 24.

When the auditor camera controller 12-2 detects a gesture (raising hand) in the auditor camera image in this state, the state shifts to State G as described in Event of State H (FIG. 23). In response to this shift, the switcher 33 switches the board extraction result image to the auditor camera image, and outputs the auditor camera image as indicated in State G in FIG. 24.

On the other hand, when the board camera controller 12-3 determines that writing to or deleting from the board is not detected in the board camera image for a fixed period or longer, the state shifts to State I as described in Event of State H (FIG. 23). At this time, the center control unit 31 instructs the lecturer camera controller 12-1, the auditor camera controller 12-2, the board camera controller 12-3, and the switcher 33 to perform actions described in Behavior of State I (FIG. 23).

In response to this instruction, the switcher 33 switches from the board extraction result image and output the image obtained by merging the lecturer camera image and the board extraction result image side-by-side as indicated in State I in FIG. 24.

When the auditor camera controller 12-2 detects a gesture (raising hand) in the auditor camera image in this state, the state shifts to State G as described in Event of State I (FIG. 23). In response to this shift, the switcher 33 switches the lecturer camera image and the board extraction result image obtained by side-by-side merging to the auditor camera image, and outputs the auditor camera image as depicted in State G in FIG. 24.

On the other hand, when the board camera controller 12-3 detects writing to or deleting from the board, the state again shifts to State H as described in Event of State H (FIG. 23). In response to this shift, the switcher 33 switches the lecturer camera image and the board extraction result image obtained by side-by-side merging to the board extraction result image, and outputs the board extraction result image as depicted in State H in FIG. 24.

According to the configuration described above, the board extraction result image is outputted during writing on the blackboard B1 by the lecturer L1 (State H). When the lecturer L1 stops board writing for a while, an image in which a state of the lecturer L1 appears is outputted in addition to the board extraction result image (State I). Basically, the shift between State H and State I is repeated as the state of the imaging system to output an image in which writing on the board chiefly appears. Accordingly, the audience can recognize detailed contents of the lecture.

3. THIRD EMBODIMENT (Configuration Example of Imaging System)

Figure 25:
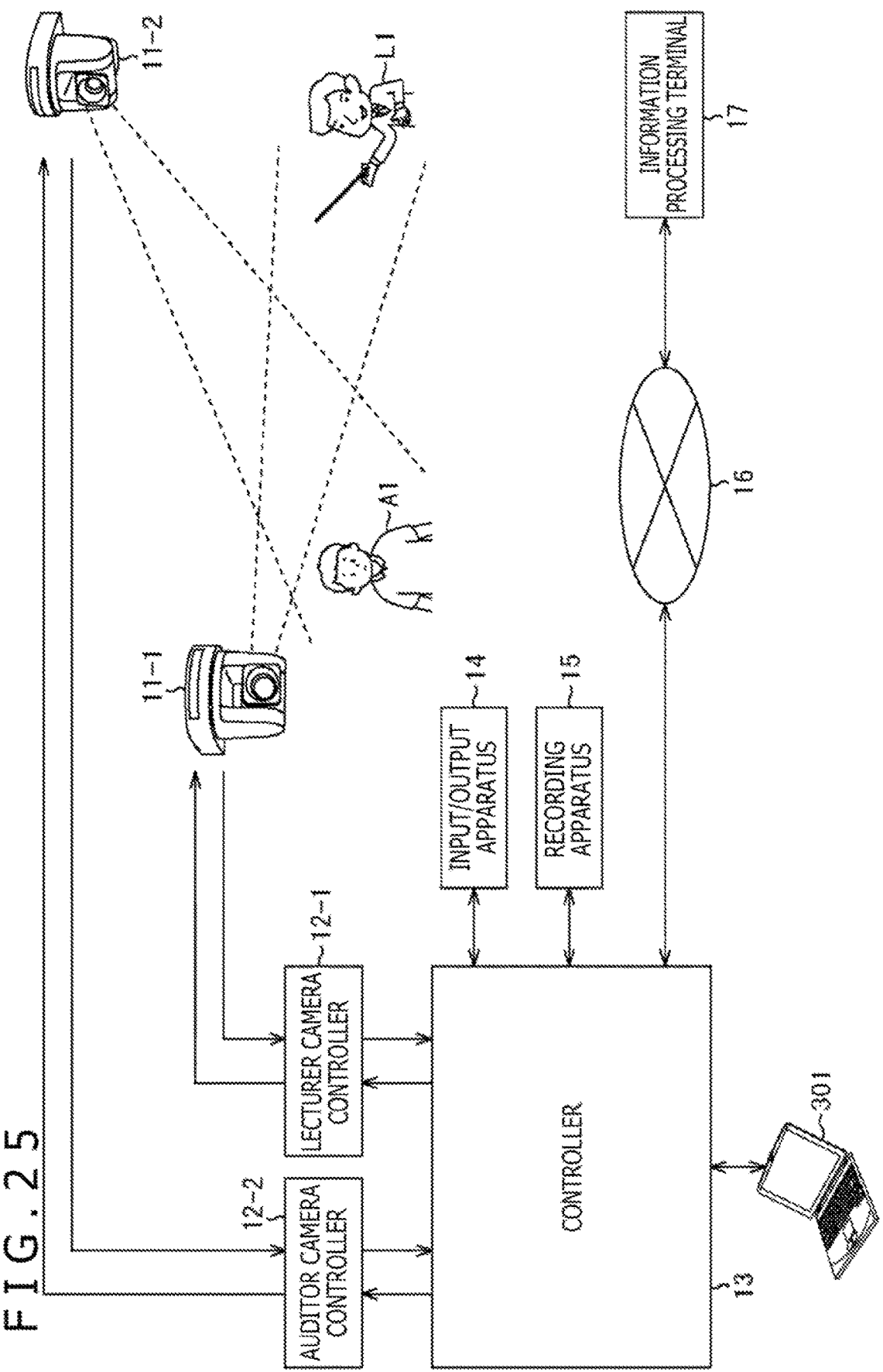
FIG. 25 is a diagram depicting a further configuration example of the imaging system.

FIG. 25 is a diagram depicting a further configuration example of the imaging system to which the present technology is applied.

The imaging system in FIG. 25 includes a PC for slide 301 in addition to the configuration of the imaging system in FIG. 1.

The PC for slide 301 as an information processing apparatus is connected to the controller 13, and outputs slides for presentation and data associated with materials to the controller 13 under control by the controller 13. In this case, the switcher 33, in this case, the switcher 33 controls output of at least either the respective camera images or the slides in accordance with a situation of the object of each of the camera images (including output change of the slides (materials)). Note that the slides and the materials outputted from the PC for slide 301 are also output to (displayed in) a not-depicted screen provided behind the lecturer L1 (on the side opposite to the auditors A1).

The PC for slide 301 is configured as a personal computer, but may be configured as a portable terminal apparatus such as a tablet terminal and a smartphone.

(Description Example of Scenario)

Figure 26:
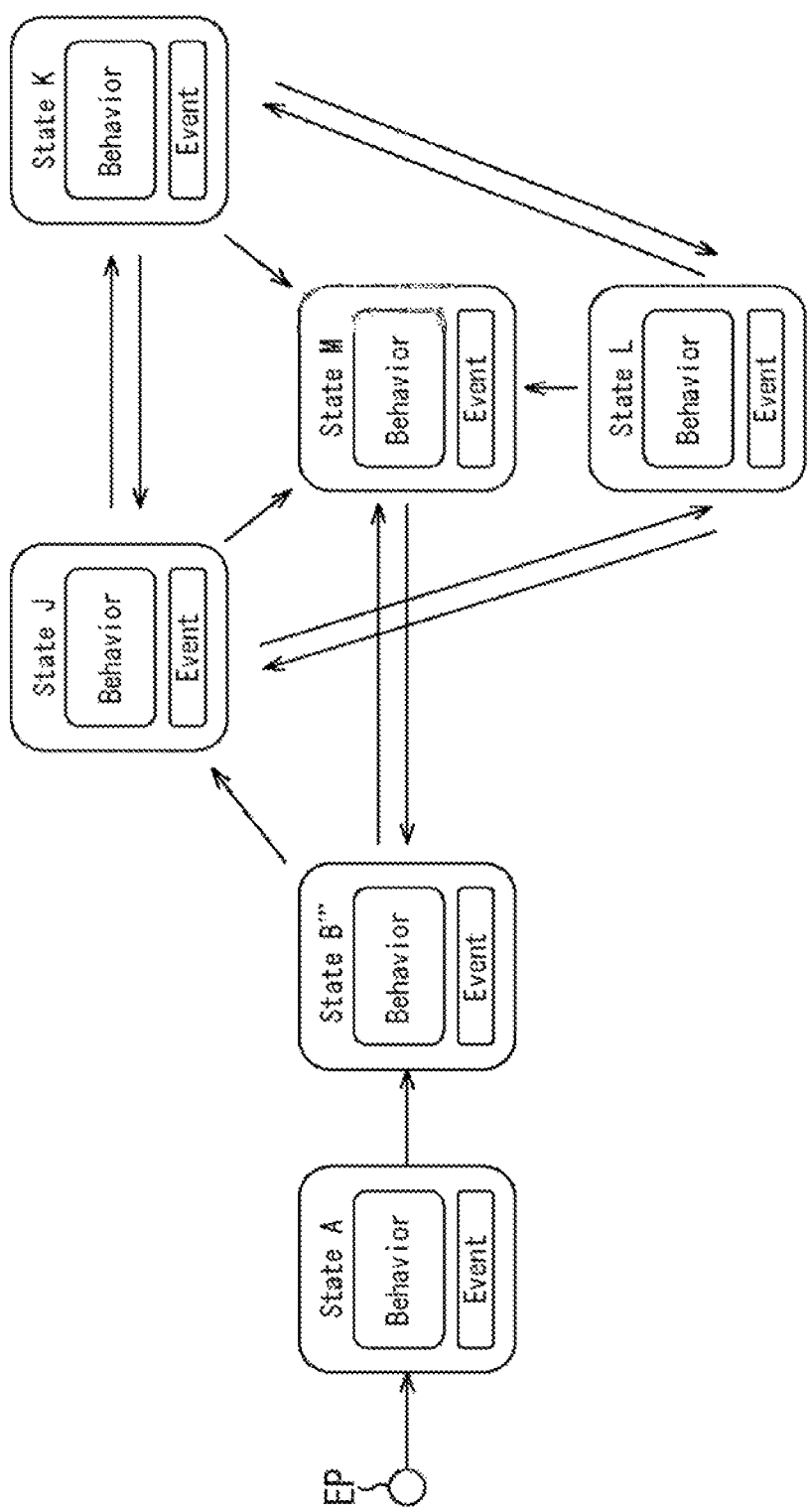
FIG. 26 is a diagram depicting a description example of a scenario.

FIG. 26 is a diagram depicting a description example of a scenario which defines actions of the imaging system in FIG. 25.

According to the scenario in FIG. 26, State B in the scenario in FIG. 5 is switched to State B‴, and States J, K, L, and M are provided instead of States C, D, E, and F.

FIG. 27 is a diagram depicting details of State B‴, while FIGS. 28 and 29 are diagrams depicting details of States J, K, L, and M.

As actions of the lecturer camera controller 12-1, pan-tilt imaging on the Tele side, and execution of tracking (by the lecturer camera 11-1) are described in Behavior of State B‴ (FIG. 27). Moreover, as actions of the auditor camera controller 12-2, fixed imaging on the Wide side, and execution of gesture (applause) detection (by the auditor camera 11-2) are described. Further described are output of the slides as an action of the PC for slide 301, and output of the lecturer camera image as an action of the switcher 33.

A shift of the state to State M in a case where the auditor camera controller 12-2 detects a gesture (applause) is described in Event of State B‴. Moreover, a shift of the state to State J in a case where the PC for slide 301 executes switching of slides (slide feeding) is described.

As actions of the lecturer camera controller 12-1, pan-tilt imaging on the Tele side, and execution of tracking (by the lecturer camera 11-1) are described as Behavior of State J (FIG. 28). Moreover, as actions of the auditor camera controller 12-2, fixed imaging on the Wide side, and execution of gesture (applause) detection (by the auditor camera 11-2) are described. Further described are output of slides as an action of the PC for slide 301, and output of these slides as an action of the switcher 33.

A shift of the state to State K in a case where the lecturer camera controller 12-1 detects a gesture (body language), and a shift of the state to State L in a case where the lecturer camera controller 12-1 determines that the tracking target has moved by a fixed distance or longer are described in Event of State J. Moreover, a shift of the state to State M in a case where the auditor camera controller 12-2 detects a gesture (applause) is described.

As actions of the lecturer camera controller 12-1, pan-tilt imaging on the Tele side, and execution of tracking (by the lecturer camera 11-1) are described in Behavior of State K (FIG. 28). Moreover, as actions of the auditor camera controller 12-2, fixed imaging on the Wide side, and execution of gesture (applause) detection (by the auditor camera 11-2) are described. Further described are output of the slides as an action of the PC for slide 301, and side-by-side merging of the lecturer camera image and the slides and outputting the merged image as an action of the switcher 33.

A shift of the state to State L in a case where the lecturer camera controller 12-1 determines that the tracking target has moved by a fixed distance or longer is described in Event of State K. Moreover, a shift of the state to State M in a case where the auditor camera controller 12-2 detects a gesture (applause) is described. Furthermore, a shift of the state to State J in a case where the PC for slide 301 executes switching of the slides is described.

As actions of the lecturer camera controller 12-1, pan-tilt imaging at an angle of view sufficient for including both the lecturer L1 and the slides output to the screen behind the lecturer L1, and execution of tracking (by the lecturer camera 11-1) are described in Behavior of State L (FIG. 29). Moreover, as actions of the auditor camera controller 12-2, fixed imaging on the Wide side, and execution of gesture (applause) detection (by the auditor camera 11-2) are described. Further described are output of the slides as an action of the PC for slide 301, and output of the lecturer camera image as an action of the switcher 33.

A shift of the state to State K in a case where the lecturer camera controller 12-1 detects a gesture (body language) is described in Event of State L. Moreover, a shift of the state to State M in a case where the auditor camera controller 12-2 detects a gesture (applause) is described. Furthermore, a shift of the state to State J in a case where the PC for slide 301 executes switching of the slides is described.

As actions of the lecturer camera controller 12-1, pan-tilt imaging on the Tele side, and execution of tracking (by the lecturer camera 11-1) are described in Behavior of State M (FIG. 29). Moreover, as an action of the auditor camera controller 12-2, pan-tilt imaging on the Tele side (by the auditor camera 11-2) is described. Further described are output of the slides as an action of the PC for slide 301, and output of the auditor camera image as an action of the switcher 33.

A shift of the state to State B''' in a case where the center control unit 31 determines an elapse of a fixed period since the outputted image is switched to the auditor camera image, for example, is described in Event of State M.

(Action Example of Imaging System Based on Scenario)

Subsequently, an action example of the imaging system based on the scenario in FIG. 26 will be described.

The scenario in FIG. 26 is different from the scenario in FIG. 5 in that State B''', State J, State K, State L, and State M are provided. Accordingly, state shifts between these States will be described with reference to FIG. 30.

Figure 30:
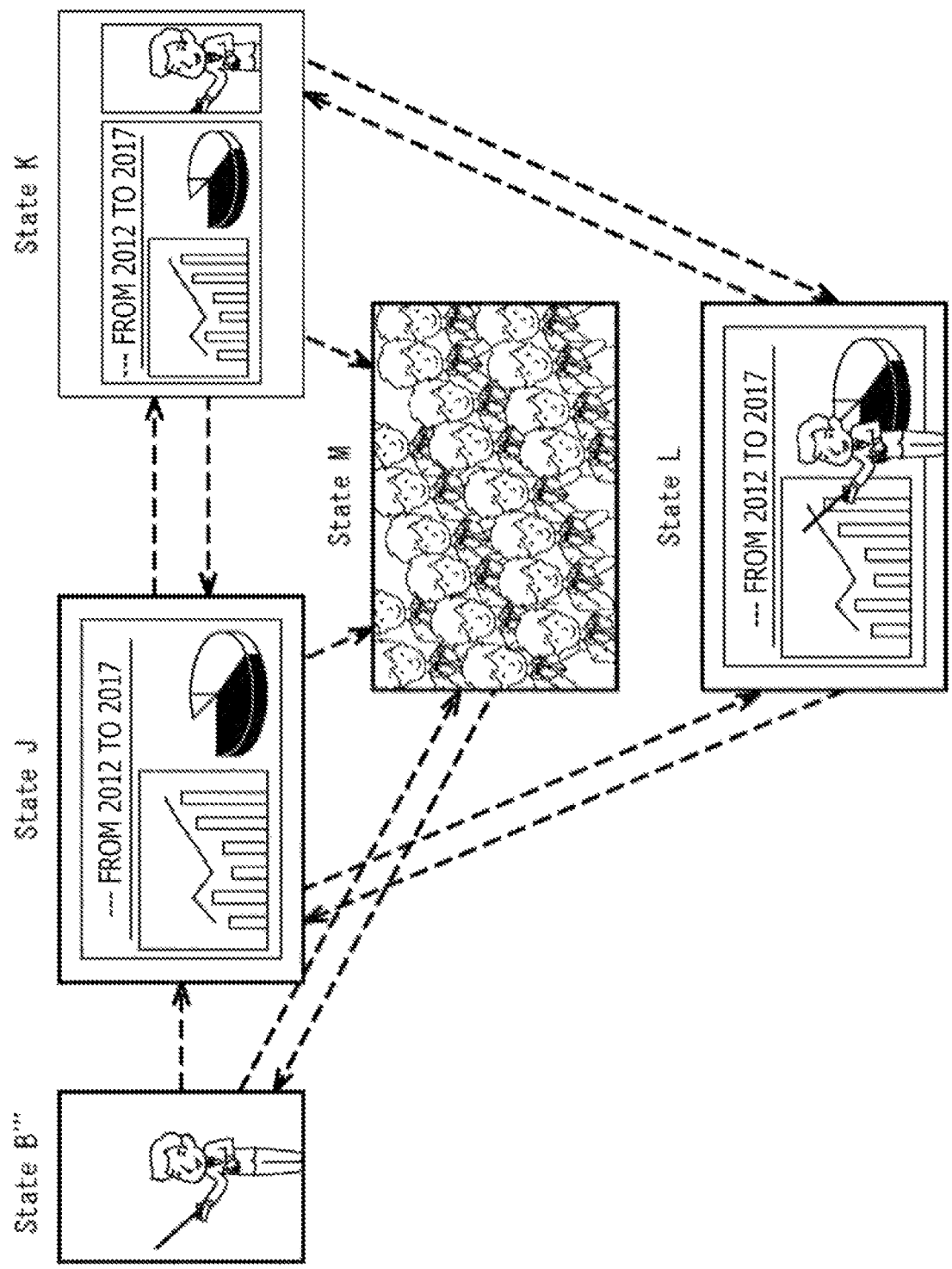
FIG. 30 is a diagram depicting an action example of the imaging system based on the scenario.

When the auditor camera controller 12-2 detects a gesture (applause) in the auditor camera image in State B''' in FIG. 30, the state shifts to State M as described in Event of State B''' (FIG. 27).

On the other hand, the state shifts to State J when the PC for slide 301 executes switching of the slides as described in Event of State B''' (FIG. 27). In response to this shift, the switcher 33 switches the lecturer camera image to the slides, and outputs the slides as indicated in State J in FIG. 30.

When the lecturer camera controller 12-1 detects a gesture (body language) in the lecturer camera image in this state, the state shifts to State K as described in Event of State J (FIG. 28). In response to this shift, the switcher 33 switches from the slides and outputs an image obtained by merging the lecturer camera image and the slides side by side as indicated in State K in FIG. 30.

When the lecturer camera controller 12-1 determines that the tracking target has moved by a fixed distance or longer in the lecturer camera image in this state, the state shifts to State L as described in Event of State K (FIG. 28). In response to this shift, the switcher 33 switches from the image obtained by merging the lecturer camera image and the slides side by side and outputs the lecturer camera image at an angle of view sufficient for including the lecturer L1 and the slides behind the lecturer L1 as depicted in State L in FIG. 30.

When the lecturer camera controller 12-1 detects a gesture (body language) in the lecturer camera image in this state, the state shifts to State K as described in Event of State L (FIG. 29). In addition, the state again shifts to State J when the PC for slide 301 executes switching of the slides.

On the other hand, when the auditor camera controller 12-2 detects a gesture (applause) in the auditor camera image in State K, the state shifts to State M as described in Event of State K (FIG. 28). In addition, the state again shifts to State J when the PC for slide 301 executes switching of the slides.

Furthermore, the state again shifts to state L when the lecturer camera controller 12-1 determines that the tracking target has moved by a fixed distance or longer in the lecturer camera image in State J as described in Event of State J (FIG. 28). On the other hand, when the auditor camera controller 12-2 detects a gesture (applause) in the auditor camera image, the state shifts to State M.

In State M, the auditor camera image is outputted as indicated in State M in FIG. 30. While execution of pan-tilt imaging on the Tele side is described in Behavior of State M (FIG. 29), the entire auditors may be imaged by fixed imaging on the Wide side. Moreover, the imaging position and camerawork of the auditor camera 11-2 in State M may be preset beforehand.

Thereafter, when the center control unit 31 determines an elapse of a fixed period such as completion of the preset camerawork, the state again shifts to State B''' as described in Event of State M (FIG. 29).

In a case of slide switching, this slide is highly likely to be a slide the lecturer L1 desires to show, and therefore is outputted according to the configuration described above (State J). In a case where a body language performed by the lecturer L1 is exaggerated, an image in which a state of the lecturer appears is outputted in addition to the slide (State K). In this manner, enthusiasm of the lecturer L1 for the lecture can be effectively felt by the audience.

Moreover, in a case where the lecturer L1 starts walking, a dynamic image can be provided by imaging with camerawork which tracks the lecturer L1 at a slightly zooming-out angle of view (State L). Furthermore, in a case where the auditors A1 applaud, an image with a realistic sensation can be provided by outputting an image in which the auditors appear (State M).

Basically, images in which the slides chiefly appear are outputted, and also images of the lecturer L1 and the auditor A1 are effectively inserted. Accordingly, the audience can recognize detailed contents of the presentation while feeling a realistic sensation.

4. OTHER VARIATION EXAMPLES

Other variations of the embodiments described above will be hereinafter described.

(Configuration Example of Imaging System)

Figure 31:
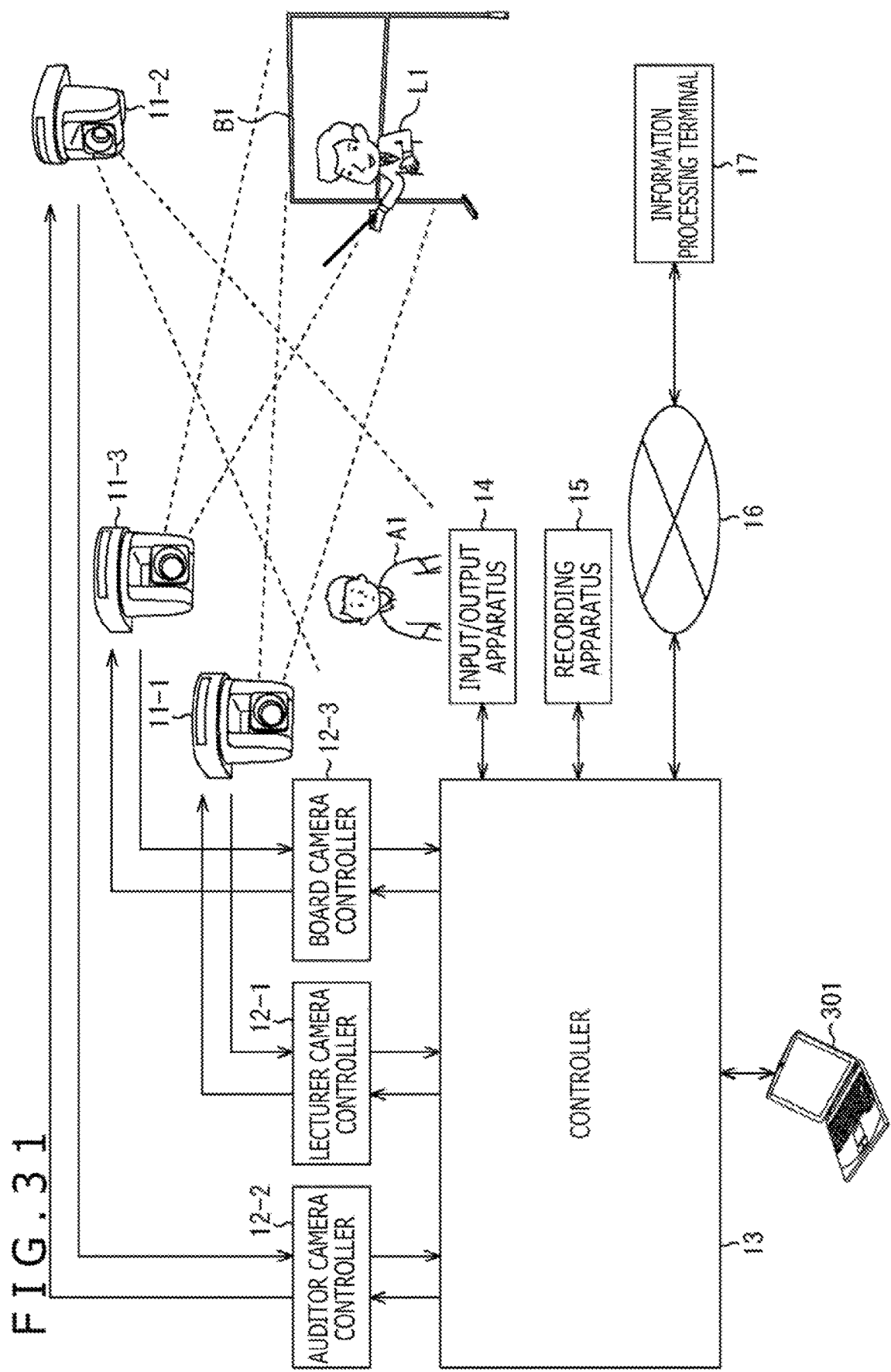
FIG. 31 is a diagram depicting a still further configuration example of the imaging system.

FIG. 31 is a diagram depicting a still further configuration example of the imaging system to which the present technology is applied.

An imaging system in FIG. 31 includes the board camera 11-3, the board camera controller 12-3, and the PC for slide 301 in addition to the configuration of the imaging system in FIG. 1.

Accordingly, the imaging system in FIG. 31 has a configuration combining the imaging system in FIG. 19 and the imaging system in FIG. 25.

According to this configuration, the audience can recognize detailed contents of presentation while recognizing detailed contents of a lecture, or feeling a realistic sensation.

(Functional Configuration Example of Camera Controller)

Figure 32:
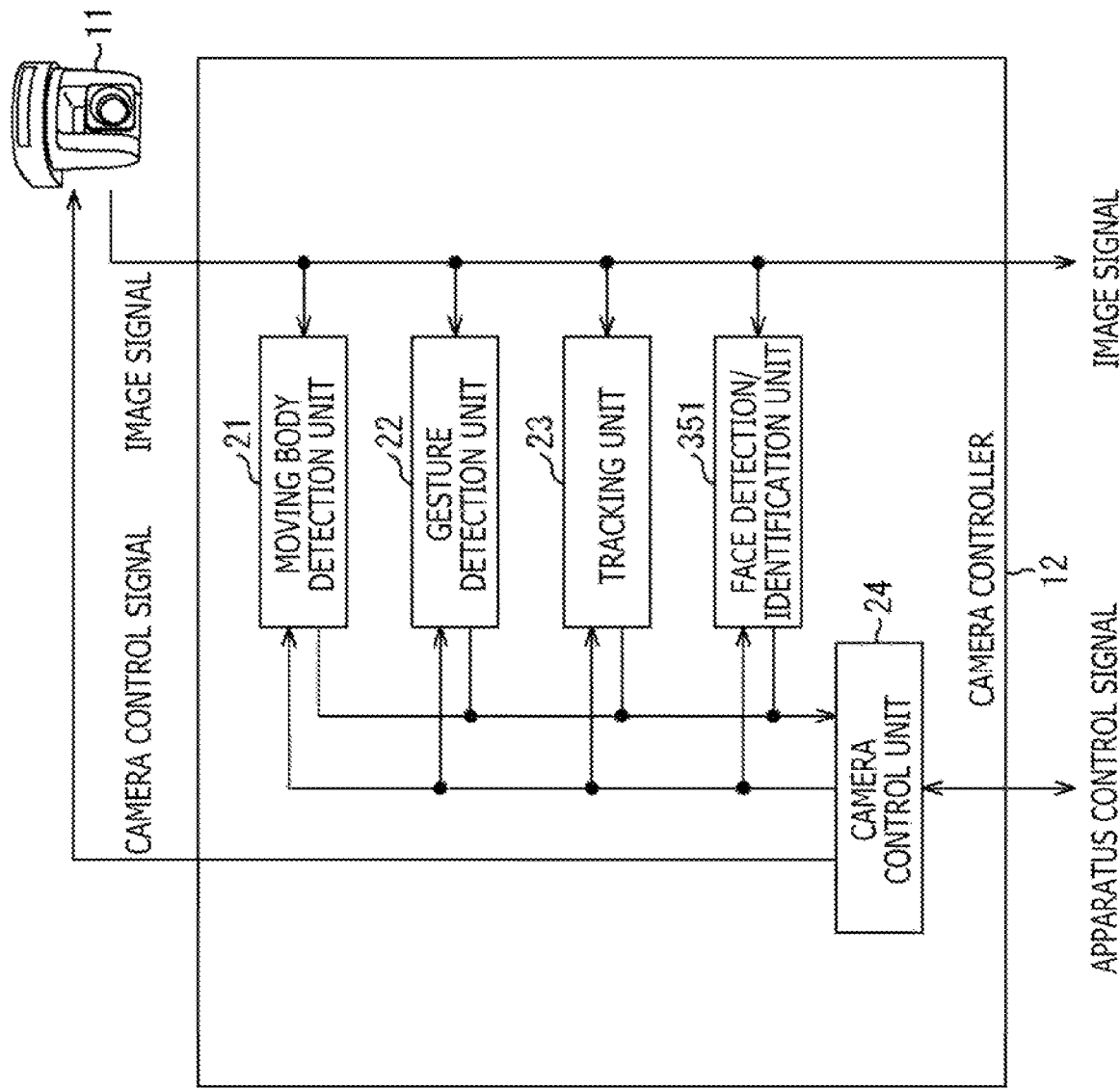
FIG. 32 is a block diagram depicting a functional configuration example of a camera controller.

FIG. 32 is a block diagram depicting another functional configuration example of the camera controller 12 described above.

The board camera controller 12 in FIG. 32 includes the face detection/identification unit 351 in addition to the configuration of the camera controller 12 in FIG. 2.

The face detection/identification unit 351 acquires a camera image from each of the cameras 11, and detects a face in the camera image or identifies this face as a particular face under control by the camera control unit 24. Information indicating that the face has been detected, or information indicating that the face has been identified is supplied to the controller 13 (center control unit 31) via the camera control unit 24.

Note that the face detection/identification unit 351 may detect a human or identify this human as a particular person, rather than the face in the camera image. Moreover, the camera controller 12 may additionally have a sophisticated function performing other types of recognition processing, artificial intelligence processing or the like, rather than the face detection/identification unit 351.

In a case where the camera controller 12 includes the face detection/identification unit 351, State A and State E constituting the scenario in FIG. 5 may be switched to State A' and State E', respectively, depicted in FIG. 33.

As the action of the lecturer camera controller 12-1 to be described in Behavior of State A', "execute moving body detection at the preset position (platform)" described in Behavior of State A (FIG. 6) is switched to "execute face detection or face identification at the preset position (platform)."

In addition, as the condition for shifting to State B to be described in Event of State A', "moving body is detected at the preset position (platform)" by the lecturer camera controller 12-1 is switched to "face is detected or particular face is identified at the preset position (platform)."

On the other hand, as the action of the lecturer camera controller 12-1 to be described in Behavior of State E', "execute moving body detection" described in Behavior of State E (FIG. 8) is switched to "execute face detection or face identification."

In addition, as the condition for shifting to State F to be described in Event of State E', "a plurality of the moving bodies are detected at the preset position (platform)" by the lecturer camera controller 12-1 is switched to "a plurality of (i.e., two or more persons as lecturer and auditor) faces are detected or a plurality of particular faces are identified at the preset position (platform)."

In this manner, the state of the imaging system can be shifted in response to a trigger given by the added function, such as face detection and face identification. Moreover, the existing function and the added function may be combined and executed to achieve an appropriate angle of view or camerawork, for example, by utilizing the added function such as the position of the face detected by face detection.

(Other Description Example of Scenario)

Figure 34:
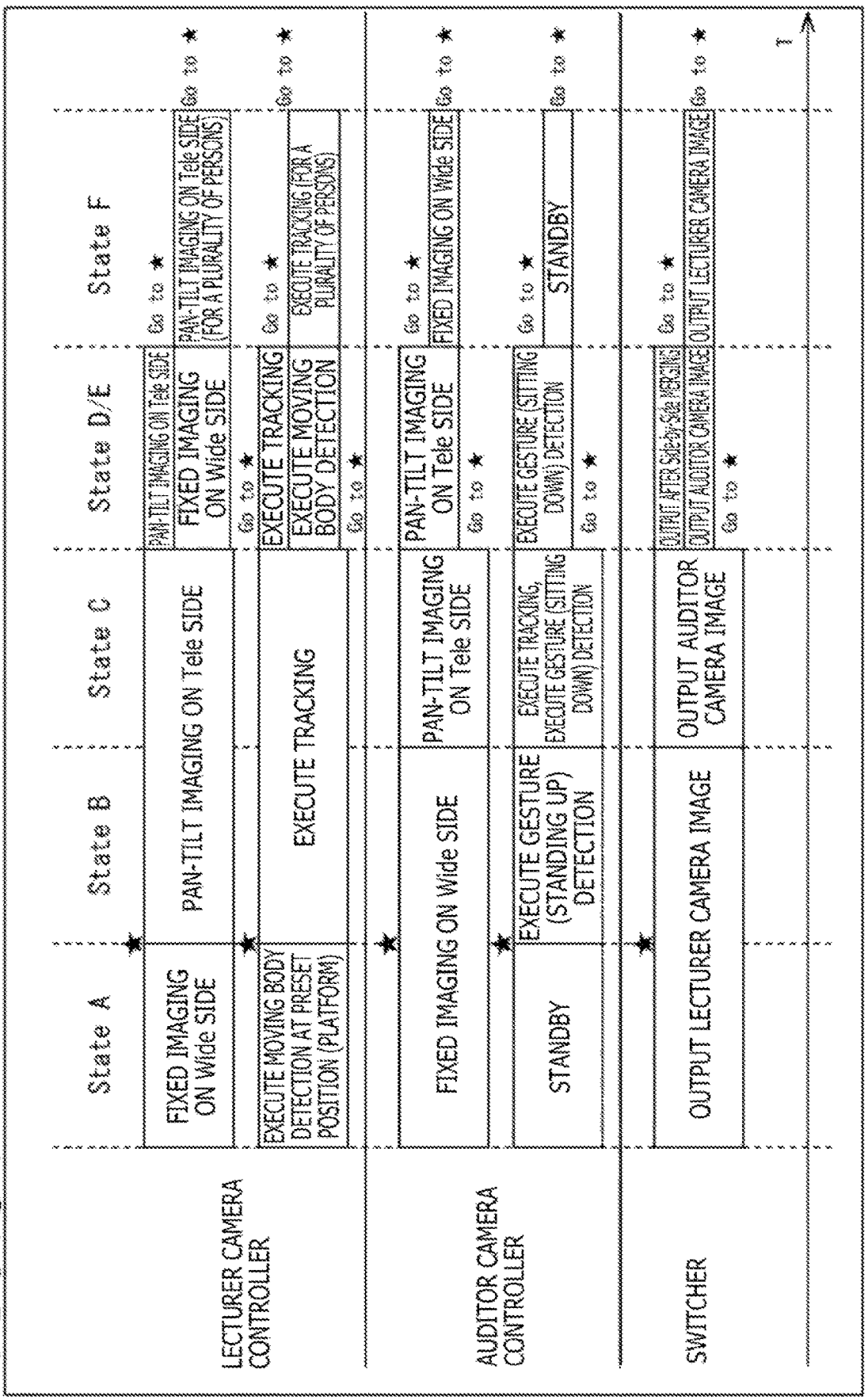
FIG. 34 is a diagram depicting a description example of a scenario expressed by a timeline.

While the scenario is expressed by the state shift chart in the above case, the scenario may be expressed by a timeline as depicted in FIG. 34.

The scenario in FIG. 34 is a scenario depicted in FIG. 5 and expressed by a timeline to represent a shift of the state in time series from the left side to the right side in the figure. The scenario in FIG. 34 indicates actions (Behaviors) executed by the lecturer camera controller 12-1, the auditor camera controller 12-2, and the switcher 33 for each State.

It is assumed in the scenario in FIG. 34 that the action of each of the apparatuses (resources) after State C is branched into three parts, and that branching conditions in this case are similar to the corresponding conditions in Event of State C indicated in FIG. 7. Note that "Go to ★" refers to a return to a start point (★) of State B.

In this manner, the scenario may be expressed by a timeline as well.

(Configuration Example of Computer)

A series of processes described above may be executed by either hardware or software. In a case where the series of processes are executed by software, a program constituting the software is installed from a program recording medium into a computer incorporated in dedicated hardware, a general-purpose personal computer, or the like.

Figure 35:
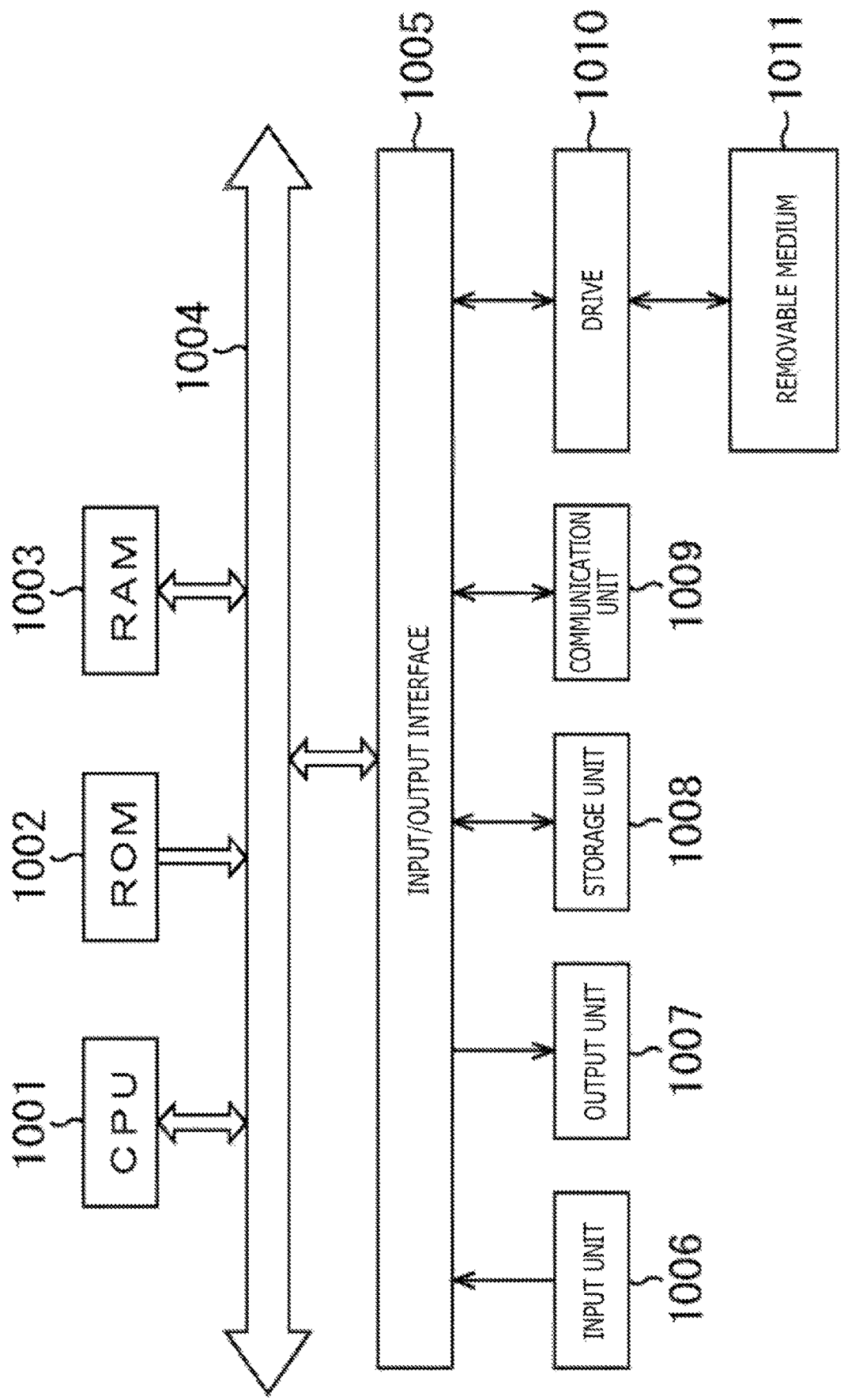
FIG. 35 is a block diagram depicting a configuration example of a computer.

FIG. 35 is a block diagram depicting a configuration example of hardware of a computer which executes the series of processes described above under the program.

The controller 13 described above is implemented by a computer having a configuration depicted in FIG. 35.

A CPU 1001, a ROM 1002, a RAM 1003 are connected to each other via a bus 1004.

An input/output interface 1005 is further connected to the bus 1004. An input unit 1006 including a keyboard, a mouse and the like, and an output unit 1007 including a display, a speaker and the like are connected to the input/output interface 1005. Moreover, a storage unit 1008 including a hard disk, a non-volatile memory and the like, a communication unit 1009 including a network interface and the like, and a drive 1010 driving a removable medium 1011 are connected to the input/output interface 1005.

According to the computer configured as above, the CPU 1001 executes the program stored in the storage unit 1008 and loaded into the RAM 1003 via the input/output interface 1005 and the bus 1004 to perform the series of processes described above, for example.

The program executed by the CPU 1001 is recorded in the removable medium 1011, or provided via a wired or wireless transmission medium such as a local area network, the Internet, and digital broadcasting, for example, and is installed in the storage unit 1008.

Note that the program executed by the computer may be a program where processes are performed in time series in the order described in the present description, or may be a program where processes are performed in parallel or at necessary timing such as an occasion when a call is made.

5. APPLICATION EXAMPLES

The technology according to the present disclosure is applicable to various systems. For example, the imaging system described above is applicable to a conference system, or a surgery room system described hereinafter.

Figure 36:
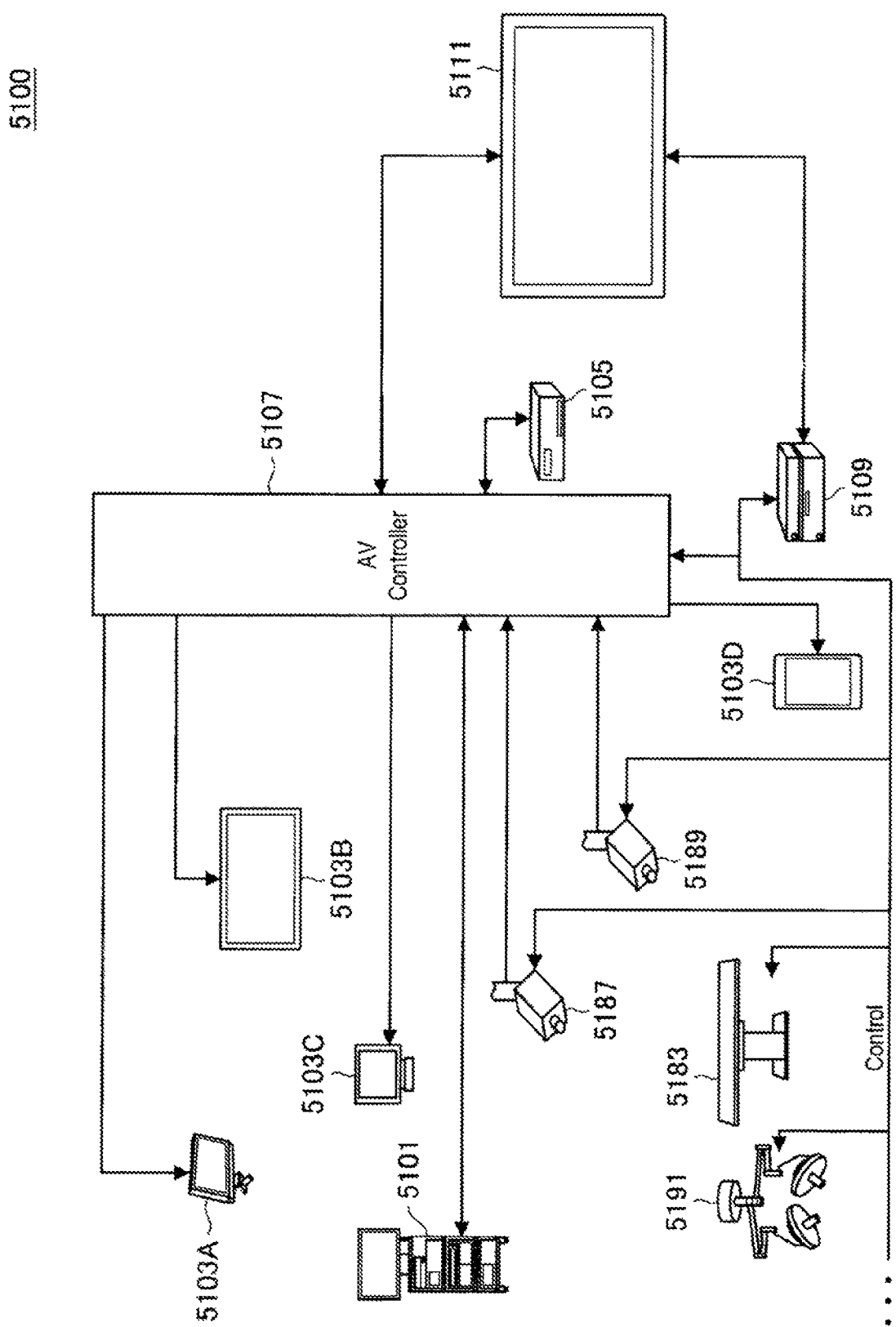
FIG. 36 is a view schematically depicting a general configuration of a surgery room system.

FIG. 36 is a view schematically depicting a general configuration of a surgery room system 5100 to which the technology according to an embodiment of the present disclosure can be applied. Referring to FIG. 36, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 36, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 36, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 37:
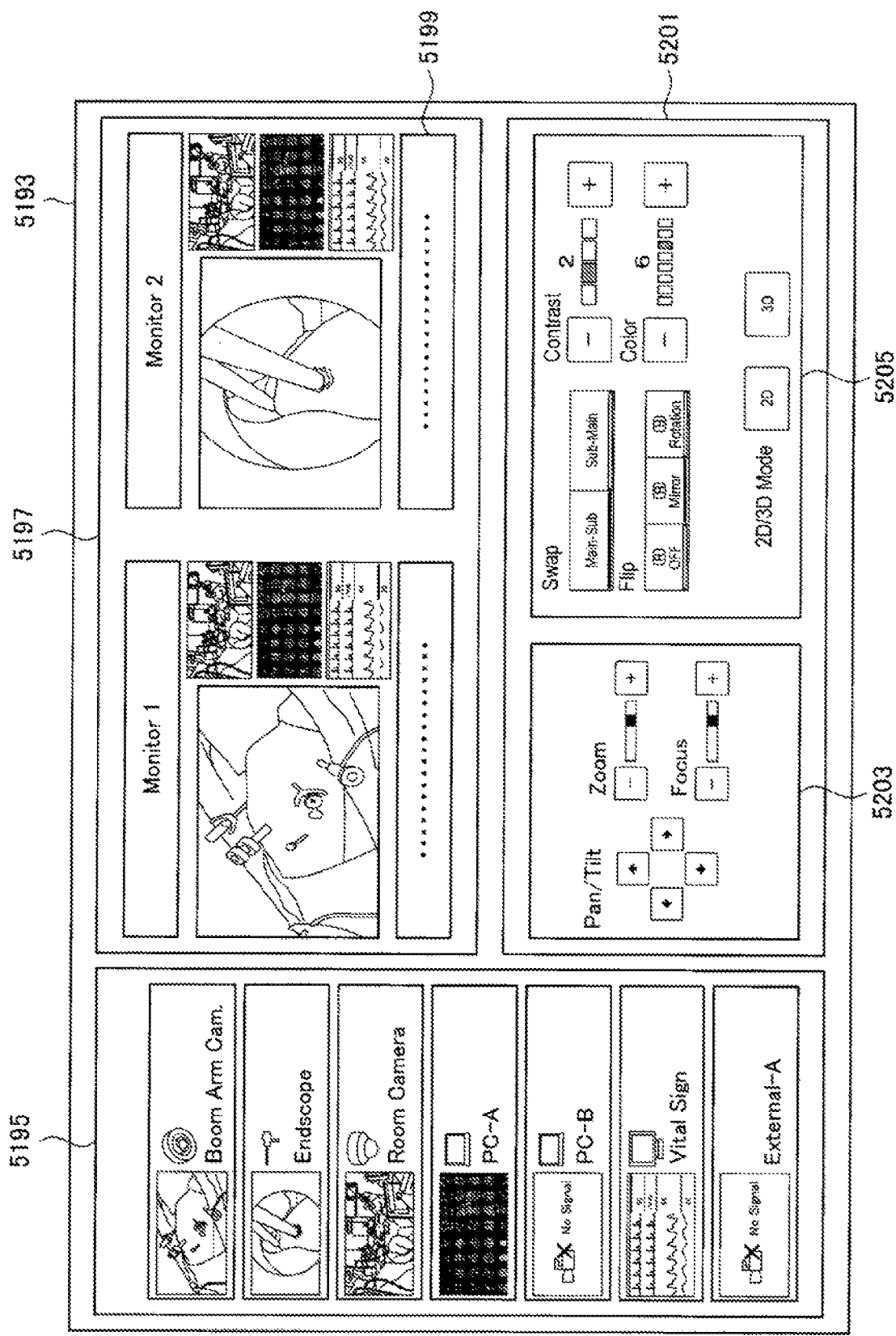
FIG. 37 is a view depicting an example of display of an operation screen image of a centralized operation panel.

FIG. 37 is a view depicting an example of display of an operation screen image on the centralized operation panel 5111. In FIG. 37, as an example, an operation screen image is depicted which corresponds to a case in which two display apparatus are provided as apparatus of an output destination in the surgery room system 5100. Referring to FIG. 37, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 38:
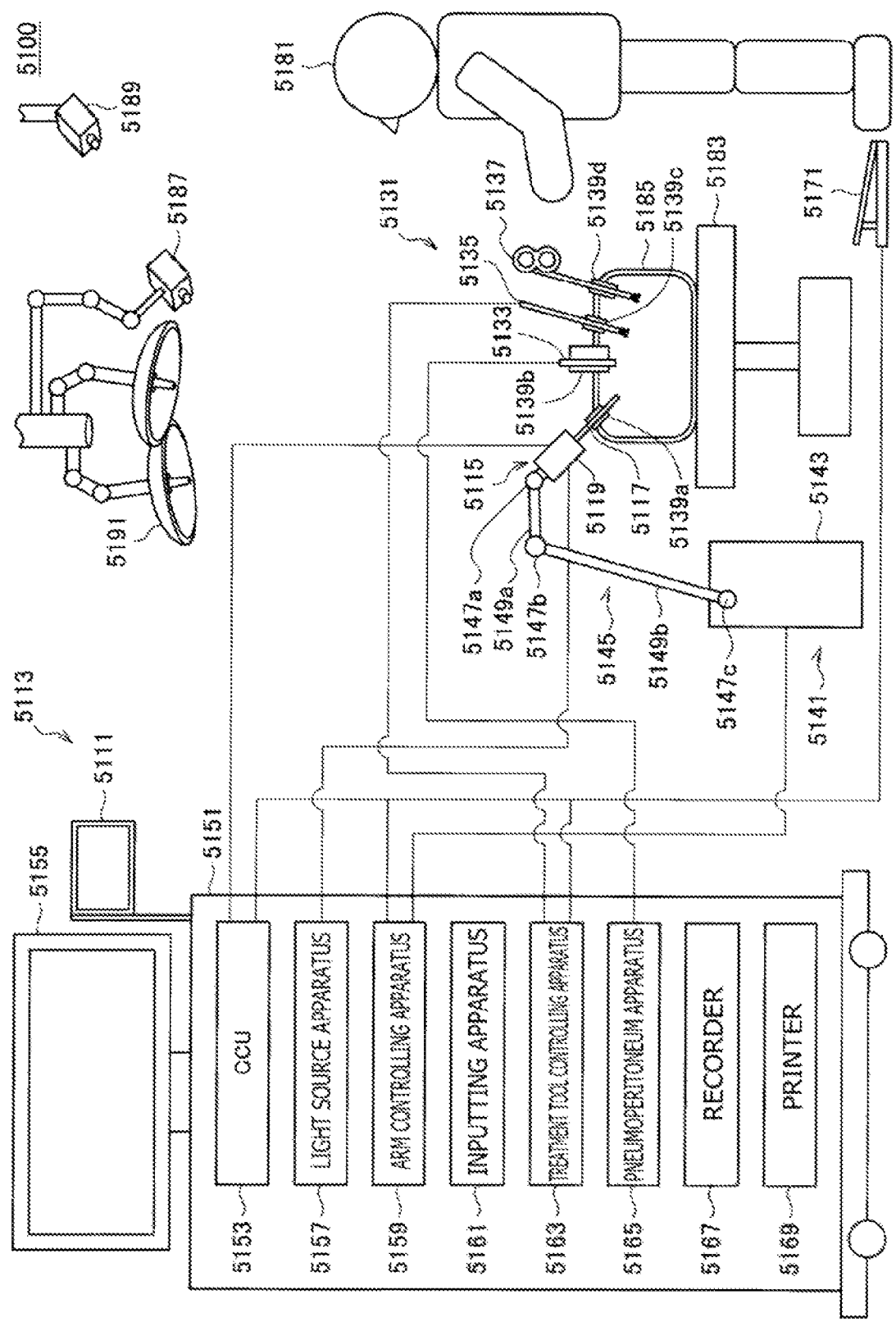
FIG. 38 is a view illustrating an example of a state of surgery to which the surgery room system is applied.

FIG. 38 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 38) as depicted in FIG. 36. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139*a* to 5139*d* are used to puncture the abdominal wall. Then, a lens barrel 5117 of the endoscope 5115 and the other surgical tools 5131 are inserted into body lumens of the patient 5185 through the trocars 5139*a* to 5139*d*. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147*a*, 5147*b* and 5147*c* and links 5149*a* and 5149*b* and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 36 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840×vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 38, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 39:
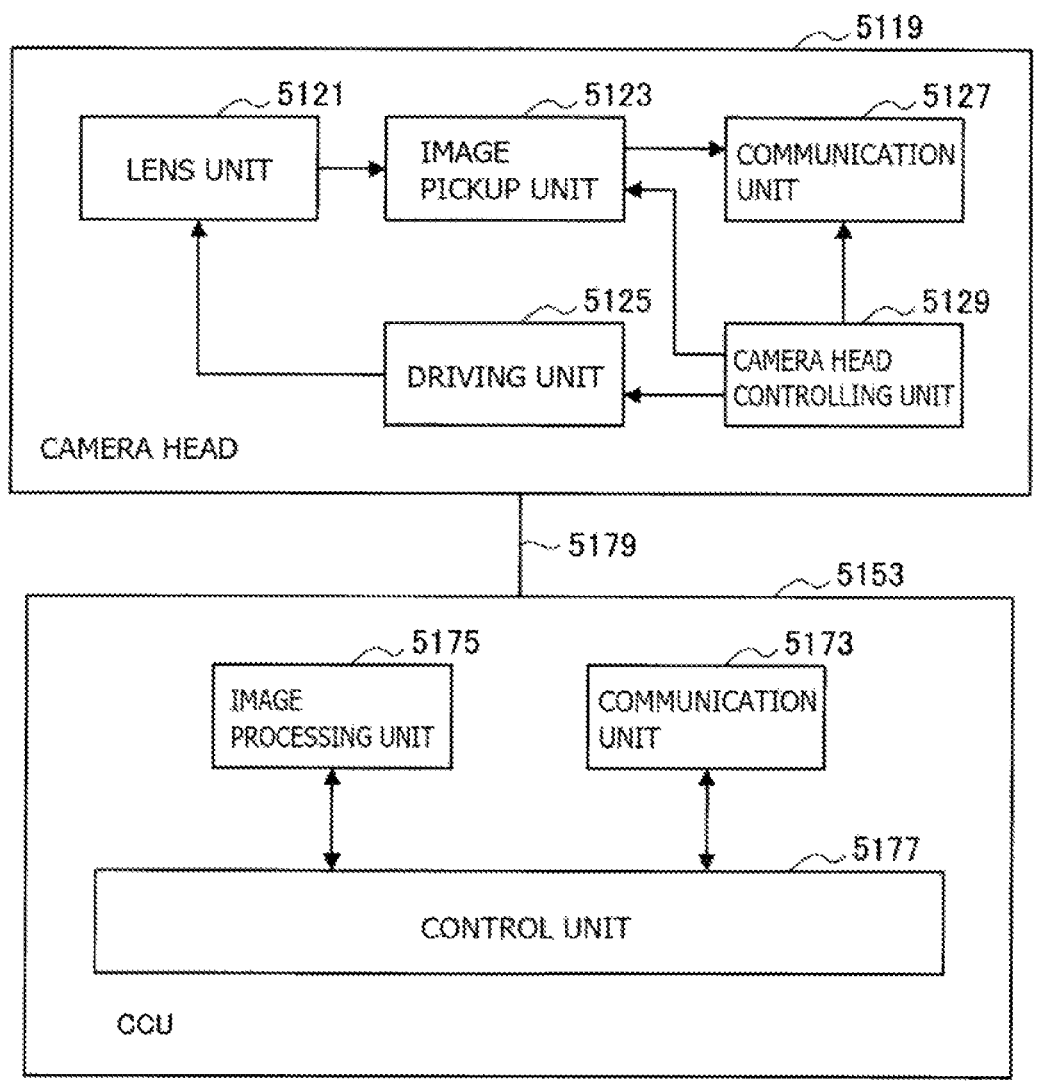
FIG. 39 is a block diagram depicting an example of a functional configuration of a camera head and a camera control unit (CCU) depicted in FIG. 38.

Functions of the camera head 5119 of the endoscope 5115 and the CCU 5153 are described in more detail with reference to FIG. 39. FIG. 39 is a block diagram depicting an example of a functional configuration of the camera head 5119 and the CCU 5153 depicted in FIG. 38.

Referring to FIG. 39, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The technology according to the present disclosure is applicable to the audiovisual controller 5107 in the configuration described above. More specifically, for example, the two ceiling cameras 5187 are disposed in such positions as to image in different directions, and the audiovisual controller 5107 corresponding to the control unit of the present technology is configured to control the imaging directions of the two ceiling cameras 5187.

The audiovisual controller 5107 controls the imaging directions of the two ceiling cameras 5187 in accordance with a situation of an object associated with each of a first image captured by the first ceiling camera 5187, and a second image captured by the second ceiling camera 5187.

By applying the technology according to the present disclosure to the audiovisual controller 5107, two images of the hands of the surgeon captured in different directions by the two ceiling cameras 5187 are outputted while appropriately switched to each other in accordance with the standing position of the surgeon, the positions of the hands of the surgeon, and the position of the surgical region, for example. Accordingly, the state of the surgery can be recorded without omissions and invisible areas of the surgical region behind the body, the hands or the like of the surgeon.

Note that embodiments according to the present technology are not limited to the embodiments described above, but may be modified in various manners without departing from the subject matters of the present technology.

Moreover, advantageous effects to be offered are not limited to the advantageous effects described in the present description and given only by way of example, but may include other advantageous effects.

Furthermore, the present technology may have following configurations.

(1)

A controller including:

a control unit that controls a first imaging direction of a first imaging unit and a second imaging direction of a second imaging unit as a direction different from the first imaging direction in accordance with a situation of an object associated with a first image captured by the first imaging unit or a second image captured by the second imaging unit.

(2)

The controller according to (1), in which the control unit controls the first imaging direction and the second imaging direction in accordance with a behavior of the object of the first image or the second image.

(3)

The controller according to (2), in which the behavior of the object includes an action of the object.

(4)

The controller according to (3), in which the action of the object includes at least any one of standing up, sitting down, raising hand, or moving.

(5)

The controller according to (2), in which the behavior of the object includes a sound emitted from the object.

(6)

The controller according to (5), in which the sound emitted from the object includes a spoken voice.

(7)

The controller according to any one of (1) to (6), in which the control unit executes moving body detection, gesture detection, and tracking of the object for the first image, the control unit executes moving body detection, gesture detection, and tracking of the object for the second image, and the control unit controls the first imaging direction and the second imaging direction in accordance with a result of any one of the moving body detection, the gesture detection, and the tracking for the first image or the second image.

(8)

The controller according to (7), in which the control unit controls output of at least either the first image or the second image in accordance with the situation of the object associated with the first image or the second image.

(9)

The controller according to (8), in which the control unit outputs the first image or the second image while switching between the first image and the second image in accordance with the situation of the object of the first image or the second image.

(10)

The controller according to (8), in which the control unit merges the first image and the second image side by side and outputs the merged image in accordance with the situation of the object of the first image or the second image.

(11)

The controller according to (8), in which the control unit merges the first image and the second image in a picture-in-picture manner and outputs the merged image in accordance with the situation of the object of the first image or the second image.

(12)

The controller according to any one of (8) to (11), in which the first image is acquired by imaging a lecturer located in the first imaging direction, the second image is acquired by imaging an auditor located in the second imaging direction, the control unit performs a board extraction process for a third image acquired by imaging a blackboard or whiteboard located in a third imaging direction different from the first imaging direction and the second imaging direction to extract contents of board writing, and the control unit controls the first to third imaging directions in accordance with a result of any one of the moving body detection, the gesture detection, and the tracking for the first image or the second image and the board extraction process, and controls output of any one of the first image, the second image, and the contents of the board writing.

(13)

The controller according to any one of (8) to (11), in which the first image is acquired by imaging a lecturer located in the first imaging direction, the second image is acquired by imaging an auditor located in the second imaging direction, and the control unit controls the first and second imaging directions in accordance with a result of any one of the moving body detection, the gesture detection, and the tracking for the first image or the second image or an output change of a third image outputted from an information processing apparatus, and controls output of any one of the first image, the second image, or the third image.

(14)

The controller according to any one of (1) to (13), in which the control unit controls actions of respective control targets on a basis of a scenario that indicates a shift of a state of each of the control targets, the scenario describes a Behavior and an Event for each of a plurality of the states, and the Behavior describes actions executed by the respective control targets, and the Event describes a shift condition for shifting to a different one of the states, and a shift destination of the state associated with the shift condition.

(15)

The controller according to (14), in which the state shifts to a second state associated with the shift condition in a case where any one of the control targets meets the shift condition described in the Event of a first state during execution of actions described in the Behavior of the first state by the respective control targets in the first state on the basis of the scenario.

(16)

The controller according to (15), in which the shift condition includes a condition based on a change of the situation of the object in the first image or the second image.

(17)

The controller according to any one of (14) to (16), in which the scenario is expressed by a state shift chart or a timeline.

(18)

The controller according to any one of (14) to (17), in which the control unit adds and deletes the states in the scenario and changes description contents of the states on a basis of an operation by a user.

(19)

The controller according to (18), in which the control unit controls display of GUI that receives addition and deletion of the states in the scenario and a change of the description contents of the states.

(20)

A control method of a controller, including:

controlling a first imaging direction of a first imaging unit and a second imaging direction of a second imaging unit as a direction different from the first imaging direction in accordance with a situation of an object associated with a first image captured by the first imaging unit or a second image captured by the second imaging unit.

(21)

A controller including:

a control unit that controls output of at least either a first image acquired by imaging in a first imaging direction or a second image different from the first image in accordance with at least a situation of an object of the first image.

(22)

The controller according to (21), in which the control unit acquires the second image by controlling imaging in a second imaging direction different from the first imaging direction, and the control unit controls output of at least either the first image or the second image in accordance with a situation of an object of the first image or the second image.

(23)

The controller according to (21), in which the first image is acquired by imaging a person located in the first imaging direction, the control unit executes moving body detection, gesture detection, and tracking of the object for the first image, the control unit acquires a result of a board extraction process that extracts contents of board writing from the second image acquired by imaging a blackboard or whiteboard located in a second imaging direction different from the first imaging direction, and the control unit controls output of at least either the first image or the contents of the board writing in accordance with a result of the moving body detection, the gesture detection, and the tracking for the first image or the board extraction process.

(24)

The controller according to (21), in which the first image is acquired by imaging a person located in the first imaging direction, the control unit executes moving body detection, gesture detection, and tracking of the object for the first image, and the control unit controls output of at least either the first image or the second image in accordance with a result of any one of the moving body detection, the gesture detection, and the tracking for the first image or an output change of the second image outputted from an information processing apparatus.

(25)

A control method of a controller, including:

controlling output of at least either a first image acquired by imaging in a first imaging direction or a second image different from the first image in accordance with at least a situation of an object associated with the first image.

REFERENCE SIGNS LIST

11 Camera
11-1 Lecturer camera
11-2 Auditor camera
11-3 Board camera
12 Camera controller
12-1 Lecturer camera controller
12-2 Auditor camera controller
12-3 Board camera controller
13 Controller
21 Moving body detection unit
22 Gesture detection unit
23 Tracking unit
24 Camera controller
31 Center control unit
32 Scenario generation unit
33 Switcher
211 Board extraction unit
301 PC for slide

The invention claimed is:

1. A controller, comprising:

processing circuitry configured to:

receive a detection result indicating a status of an object detectable in a field of view of one or more imaging devices when the field of view of the one or more imaging devices is being controlled according to a first state of a control scenario, the control scenario including a plurality of states for controlling the field of view of the one or more imaging devices;

determine whether a shift condition for triggering a shift of state specified in an event descriptor of the first state is detected according to at least the status of the object, the event descriptor further specifying a second state among the plurality of states as a shift destination associated with the shift condition; and in response to the shift condition specified in the event descriptor being determined as detected, control the field of view of the one or more imaging devices according to a behavior descriptor of the second state, the behavior descriptor specifying actions for controlling the field of view of the one or more imaging devices.

2. The controller according to claim 1, wherein the processing circuitry is configured to control the field of view of the one or more imaging devices by performing one or more of mechanical panning, mechanical tilting, optical zooming, and electronical zooming of the one or more imaging devices.

3. The controller according to claim 1, wherein the behavior descriptor specifies the actions that include controlling an angle of view and an imaging direction of the one or more imaging devices.

4. The controller according to claim 1, wherein the status of the object includes an action of the object.

5. The controller according to claim 4, wherein the object is a person, and the action of the object includes at least one of standing up, sitting down, raising hand, moving, or emitting sound.

6. The controller according to claim 1, wherein the processing circuitry is configured to receive a detection result of executing, by the processing circuitry, one or more of moving body detection, gesture detection, and tracking of the object according to one or more images captured by the one or more imaging devices.

7. The controller according to claim 1, wherein the processing circuitry is configured to control output of one or more images captured by the one or more imaging devices according to a current state among the plurality of states.

8. The controller according to claim 1, wherein the processing circuitry is configured to:
- extract contents presented on another object from the other object detectable in another field of view of another imaging device, the contents being presented on the other object in response to an interaction between the object and the other object, and the other field of view being different from the field of view; and
- control one or more of the field of view and the other field of view in accordance with at least one of the detected status or the extracted contents.

9. The controller according to claim 8, wherein
- the object corresponds to a person included in a first image captured by one of the one or more imaging devices, and
- the other object corresponds to a blackboard or whiteboard included in a second image captured by the other imaging device.

10. The controller according to claim 1, wherein the shift condition includes a condition based on a change of the status of the object.

11. The controller according to claim 1, wherein the control scenario is expressed by a state shift chart or a timeline diagram.

12. The controller according to claim 1, wherein the processing circuitry is configured to add or delete a member state of the plurality of states in the control scenario or change description contents of the plurality of states on a basis of an operation by a user.

13. The controller according to claim 12, wherein the processing circuitry is configured to control display of a graphic user interface (GUI) that receives addition and deletion of the member state of the plurality of states in the control scenario or a change of the description contents of the plurality of states.

14. A controller, comprising:
processing circuitry configured to:
- detect a status of a first object detectable in a first field of view of a first imaging device or a second object detectable in a second field of view of a second imaging device, the second field of view being different from the first field of view;
- extract contents presented on a third object from the third object detectable in a third field of view of a third imaging device, the contents being presented on the third object in response to an interaction between the first object and the third object, and the third field of view being different from the first field of view and the second field of view; and
- control one or more of the first field of view, second field of view, and the third field of view in accordance with at least one of the detected status or the extracted contents.

15. The controller according to claim 14, wherein the processing circuitry is configured to control the one or more of the first field of view, second field of view, and the third field of view by performing one or more of mechanical panning, mechanical tilting, optical zooming, and electronical zooming of corresponding one or more of the first imaging device, the second imaging device, and the third imaging device.

16. The controller according to claim 14, wherein
- the first object corresponds to a first person included in a first image captured by the first imaging device,
- the second object corresponds to a second person included in a second image captured by the second imaging device, and
- the status of the first object or the second object includes an action of the first person or the second person, including at least one of standing up, sitting down, raising hand, moving, or emitting sound.

17. The controller according to claim 16, wherein
- the third object corresponds to a blackboard or whiteboard included in a third image captured by the third imaging device, and
- the processing circuitry is configured to output a side-by-side display or a picture-in-picture display of two of the first image, the second image, and the third image in accordance with the detected status.

18. A control method of a controller, comprising:
- receiving a detection result indicating a status of an object detectable in a field of view of one or more imaging devices when the field of view of the one or more imaging devices is being controlled according to a first state of a control scenario, the control scenario including a plurality of states for controlling the field of view of the one or more imaging devices;
- determining, by processing circuitry of the controller, whether a shift condition for triggering a shift of state specified in an event descriptor of the first state is detected according to at least the status of the object, the event descriptor further specifying a second state among the plurality of states as a shift destination associated with the shift condition; and
- in response to the shift condition specified in the event descriptor being determined as detected, controlling, by the processing circuitry of the controller, the field of view of the one or more imaging devices according to a behavior descriptor of the second state, the behavior descriptor specifying actions for controlling the field of view of the one or more imaging devices.

19. The control method according to claim 18, wherein the controlling the field of view of the one or more imaging devices comprises performing one or more of mechanical panning, mechanical tilting, optical zooming, and electronical zooming of the one or more imaging devices.

20. The control method according to claim 18, wherein the behavior descriptor specifies the actions that include controlling an angle of view and an imaging direction of the one or more imaging devices.

* * * * *